(12) United States Patent
Kim et al.

(10) Patent No.: US 9,485,764 B2
(45) Date of Patent: Nov. 1, 2016

(54) METHOD AND APPARATUS FOR ENCODING TRANSPORT BLOCK

(71) Applicant: LG ELECTRONICS INC., Seoul (KR)

(72) Inventors: Bong Hoe Kim, Seoul (KR); Dong Youn Seo, Seoul (KR); Joon Kui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/099,391

(22) Filed: Apr. 14, 2016

(65) Prior Publication Data

US 2016/0234812 A1    Aug. 11, 2016

Related U.S. Application Data

(63) Continuation of application No. 14/861,849, filed on Sep. 22, 2015, now Pat. No. 9,338,691, which is a continuation of application No. 14/074,137, filed on Nov. 7, 2013, now Pat. No. 9,160,485.

(60) Provisional application No. 61/732,893, filed on Dec. 3, 2012.

(51) Int. Cl.
*H04W 4/00*     (2009.01)
*H04W 72/04*    (2009.01)
*H04L 27/34*    (2006.01)
*H04L 1/00*     (2006.01)

(52) U.S. Cl.
CPC .......... *H04W 72/042* (2013.01); *H04L 1/0071* (2013.01); *H04L 27/34* (2013.01)

(58) Field of Classification Search
None
See application file for complete search history.

(56) References Cited

U.S. PATENT DOCUMENTS

| | | |
|---|---|---|
| 8,266,513 B2 | 9/2012 | Kim et al. |
| 2009/0077446 A1 | 3/2009 | Seo et al. |
| 2012/0311397 A1 | 12/2012 | Kim et al. |

*Primary Examiner* — Chi H Pham
*Assistant Examiner* — Fahmida Chowdhury
(74) *Attorney, Agent, or Firm* — Birch, Stewart, Kolasch & Birch, LLP

(57) ABSTRACT

A method for encoding a transport block in a wireless communication system, and a wireless apparatus therefore are discussed. The method according to one embodiment includes determining, at a transmitting device, a size of the transport block based on a size of an allocated resource, a number of layers, and modulation and coding scheme (MCS) for the transport block, wherein the size of the transport block is determined from among a plurality of predetermined sizes, wherein the plurality of the predetermined sizes include 305976 bits, 324336 bits, and 391656 bits when the transport block is mapped to four-layer spatial multiplexing and when 256 Quadrature amplitude modulation (QAM) is used for the transport block; and attaching at the transmitting device, a first cyclic redundancy check (CRC) code to the transport block to configure a first CRC-attached transport block.

10 Claims, 14 Drawing Sheets

FIG. 12
Reference signal for TX antenna 1
Reference signal for TX antenna 2
Reference signal for TX antenna 3
Reference signal for TX antenna 4
Data

METHOD AND APPARATUS FOR ENCODING TRANSPORT BLOCK

CROSS-REFERENCE TO RELATED APPLICATIONS

This application is a Continuation of co-pending U.S. application Ser. No. 14/861,849 filed on Sep. 22, 2015, which is a Continuation of U.S. application Ser. No. 14/074,137 filed on Nov. 7, 2013, now U.S. Pat. No. 9,160,485 issued on Oct. 13, 2015, which claims the benefit of priority of U.S. Provisional Application No. 61/732,893 filed on Dec. 3, 2012. All these applications are incorporated by reference in their entirety herein.

BACKGROUND OF THE INVENTION

1. Field of the Invention

The present invention relates to wireless communications, and more particularly, to a method and apparatus for encoding a transport block.

2. Related Art

Extensive researches are underway in LTE (long term evolution) release 12 to improve performance in terms of capacity, coverage, coordination between cells, and costs. There is an ongoing discussion to introduce various techniques in the LTE release 12 in a technical aspect to improve performance, such as small cell enhancement, macro cell enhancement, new carrier type, machine type communication, etc.

The LTE release 12 aims at improving the capacity and coverage, which may be achieved by using small cell enhancement based on inter-site carrier aggregation, LTE-WLAN (wireless local area network) integration, and micro cell enhancement. Assuming a case where a cell is decreased in size, inter-cell movement of a terminal occurs frequently, which may result in an increase in an amount of traffic signaled when the terminal moves. To solve such a problem, a method of optimizing a small cell by decreasing signaling transmitted from an RAN (radio access network) to a core network on the basis of the small cell enhancement is under discussion in the LTE release 12.

In addition, an NCT (new carrier type) discussed in the LTE release 12 is a frame type which is newly defined differently from a legacy frame structure. Although the NCT can be a carrier type optimized for a small cell, it can also be applied to a macro cell. For example, in the NCT, an overhead generated by transmitting a reference signal such as a CRS (cell-specific reference signal) can be decreased, and a downlink control channel can be demodulated on the basis of a DM-RS (demodulation reference signal). By newly defining the NCT, energy of a base station can be saved, and an interference generated in a HetNet (heterogeneous network) can be decreased. In addition, the use of the NCT can decrease a reference signal overhead generated in data transmission using a plurality of downlink antennas. More specifically, although the legacy frame structure (e.g., a CP (cyclic prefix) length, a subframe structure, a duplexing mode, etc.) is maintained in the NCT, a control channel and/or a reference signal can be newly defined.

SUMMARY OF THE INVENTION

The present invention provides a method of encoding a transport block.

The present invention also provides an apparatus for encoding a transport block.

According to one aspect of the present invention, a method for encoding a transport block in a wireless communication system is provided. The method includes: determining, by a transmitter, a size of transport block; dividing, by the transmitter, the transport block into at least one code block based on the size of transport block; interleaving, by the transmitter, the at least one code block by an interleaver; and performing, by the transmitter, a turbo coding for the interleaved at least one code block, wherein the size of transport block is determined based on the number of the divided code blocks.

According to another aspect of the present invention, a wireless apparatus configured for encoding a transport block in a wireless communication system is provided. The wireless apparatus includes: a transceiver configured to receive radio signals; and a processor operatively coupled with the transceiver and configured to: determine a size of transport block; divide the transport block into at least one code block based on the size of transport block; interleave the at least one code block by an interleaver; and perform a turbo coding for the interleaved at least one code block, wherein the size of transport block is determined based on a number of the divided code blocks.

Data transmission and reception performance can be improved by decreasing the number of dummy bits when coding a transport block.

BRIEF DESCRIPTION OF THE DRAWINGS

FIG. 12 shows the concept of a resource block pair according to an embodiment of the present invention.

DETAILED DESCRIPTION OF THE INVENTION

A wireless device may be fixed or mobile, and may be referred to as another terminology, such as a UE (user equipment), an MS (mobile station), an MT (mobile terminal), a UT (user terminal), an SS (subscriber station), a PDA (personal digital assistant), a wireless modem, a handheld device, a terminal, a wireless terminal, etc. The wireless device may also be a device supporting only data communication such as an MTC (machine-type communication) device.

A BS (base station) is generally a fixed station that communicates with the wireless device, and may be referred to as another terminology, such as an eNB (evolved-NodeB), a BTS (base transceiver system), an access point, etc.

Operations of a UE and/or a BS in 3GPP (3rd generation partnership project) LTE (long term evolution) or 3GPP LTE-A defined based on each of releases of 3GPP TS (technical specification) will be described hereinafter. In addition, the present invention may also apply to various wireless communication networks other than the 3GPP LTE/3GPP LTE-A. In the following description, LTE and/or LTE-A are collectively referred to as LTE.

Figure 1:
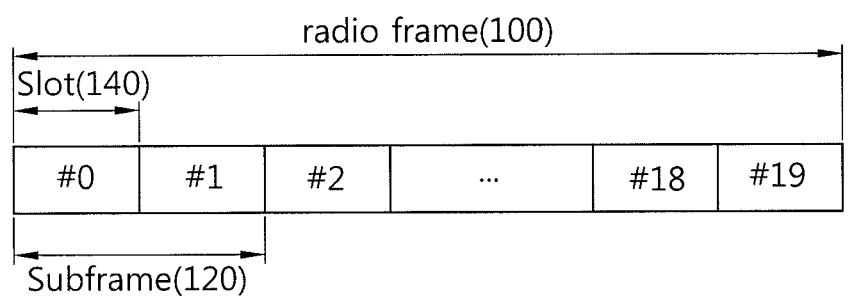
FIG. 1 shows a radio frame structure in LTE (long term evolution).

FIG. 1 shows a radio frame structure in LTE.

In 3GPP LTE, a structure of a radio frame 100 is disclosed in the section 5 of 3GPP TS 36.211 V8.2.0 (2008-03) "Technical Specification Group Radio Access Network; Evolved Universal Terrestrial Radio Access (E-UTRA); Physical channels and modulation (Release 8)".

Referring to FIG. 1, the radio frame 100 consists of 10 subframes 120. One subframe 120 consists of two slots 140. The radio frame 100 may be indexed based on the slots 140 indexed from a slot #0 to a slot #19, or may be indexed based on the subframes 120 indexed from a subframe #0 to a subframe #9. For example, the subframe #0 may include the slot #0 and the slot #1.

A time required to transmit one subframe 120 is defined as a TTI (transmission time interval). The TTI may be a scheduling unit for data transmission. For example, a length of one radio frame 100 may be 1 millisecond (ms), a length of one subframe 120 may be 1 ms, and a length of one slot 140 may be 0.5 ms.

One slot 140 includes a plurality of OFDM (orthogonal frequency division multiplexing) symbols in a time domain, and includes a plurality of subcarriers in a frequency domain. In LTE, a BS uses OFDMA as an access scheme in a downlink channel. The OFDM symbol is for representing one symbol period, and may be referred to as other terms according to a multiple access scheme. For example, an SC-FDMA (single carrier-frequency division multiple access) may be used as the multiple access scheme in an uplink channel in which data is transmitted from a UE to a BS. A symbol duration in which data is transmitted through the uplink channel may be called an SC-FDMA symbol.

The structure of the radio frame 100 described in FIG. 1 is one embodiment for a frame structure. Therefore, the number of subframes 120 included in the radio frame 100, the number of slots 140 included in the subframe 120, or the number of OFDM symbols included in the slot 140 may be changed variously to define a new radio frame format.

In the structure of the radio frame, the number of symbols included in one slot may vary depending on which CP (cyclic prefix) is used. For example, if the radio frame uses a normal CP, one slot may include 7 OFDM symbols. If the radio frame uses an extended CP, one slot may include 6 OFDM symbols.

As a duplexing scheme, a wireless communication system may use an FDD (frequency division duplex) scheme, a TDD (time division duplex) scheme, etc. In the FDD scheme, uplink transmission and downlink transmission may be performed based on different frequency bands. In the TDD scheme, uplink transmission and downlink transmission may be performed by using a time-based division scheme based on the same frequency band. Channel responses of the TDD scheme may have a reciprocal property since the same frequency band is used. That is, in the TDD scheme, a downlink channel response and an uplink channel response may be almost identical in a given frequency domain. Therefore, a TDD-based wireless communication system may acquire channel state information of a downlink channel from channel state information of an uplink channel. In the TDD system, a full frequency band is time-divided into uplink transmission and downlink transmission, and thus downlink transmission performed by the BS and uplink transmission performed by the UE may be performed simultaneously.

Figure 2:
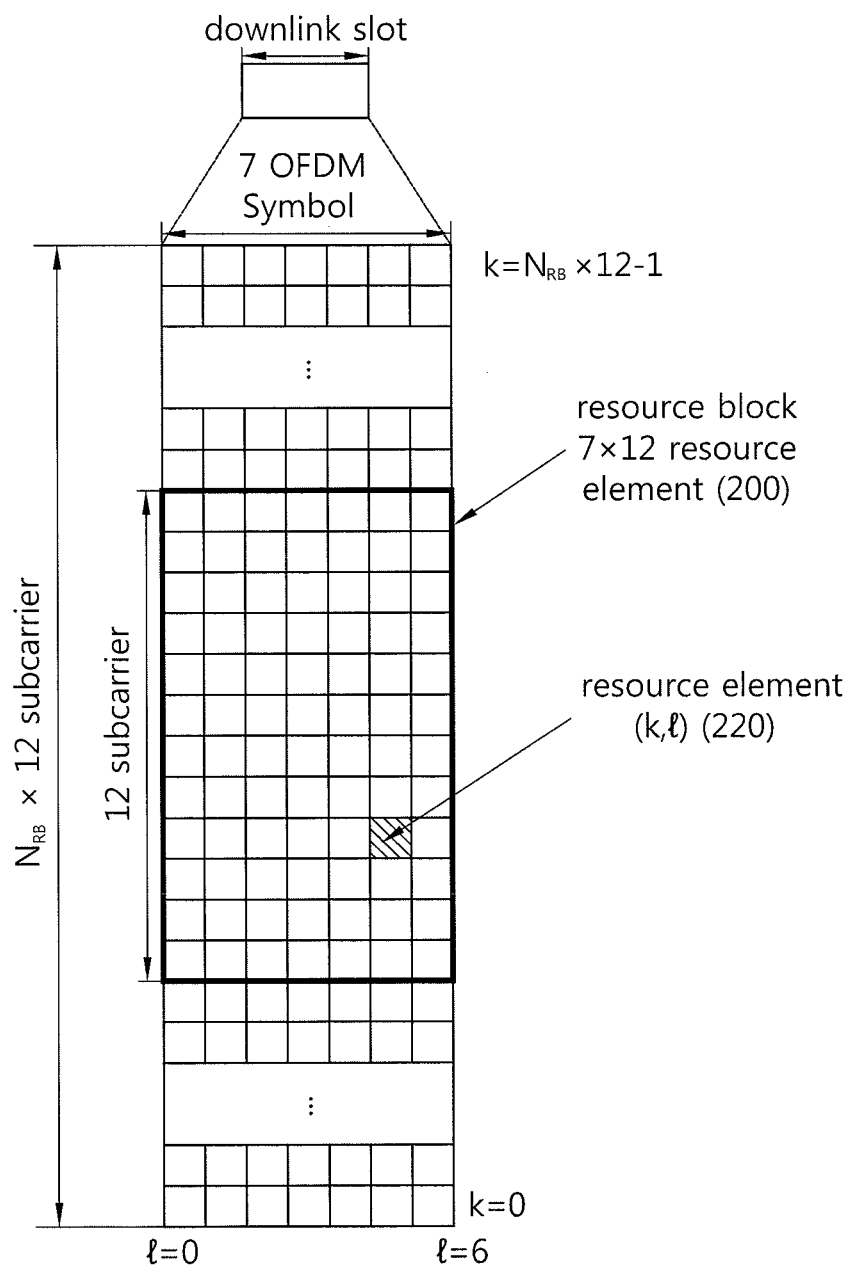
FIG. 2 shows an example of a resource grid for one downlink slot.

FIG. 2 shows an example of a resource grid for one downlink slot.

The downlink slot includes a plurality of OFDM symbols in a time domain, and includes NRB resource blocks in a frequency domain. The number NRB of resource blocks included in the downlink slot may be determined according to a downlink transmission bandwidth configured in a cell. For example, in the LTE system, NRB may be any one value in the range of 60 to 110 according to a transmission bandwidth in use. One resource block 200 may include a plurality of subcarriers in the frequency band. A structure of an uplink slot may be the same as the aforementioned structure of the downlink slot.

Each element on the resource grid is referred to as a resource element 220. The resource element 220 on the resource grid may be identified by an index pair (k,l). Herein, k(k=0, . . . , NRB×12−1) denotes a subcarrier index in the frequency domain, and l(l=0, . . . , 6) denotes an OFDM symbol index in the time domain.

Herein, one resource block 200 may include 7☐12 resource elements 220 consisting of 7 OFDM symbols in the time domain and 12 subcarriers in the frequency domain. Such a size is one example, and thus the number of OFDM symbols and the number of subcarriers constituting one resource block 200 may change. A resource block pair indicates a resource unit including two resource blocks.

The number of OFDM symbols included in one slot may have a different value depending on a CP as described above. In addition, the number of resource blocks included in one slot may vary depending on a size of a full frequency bandwidth.

Figure 3:
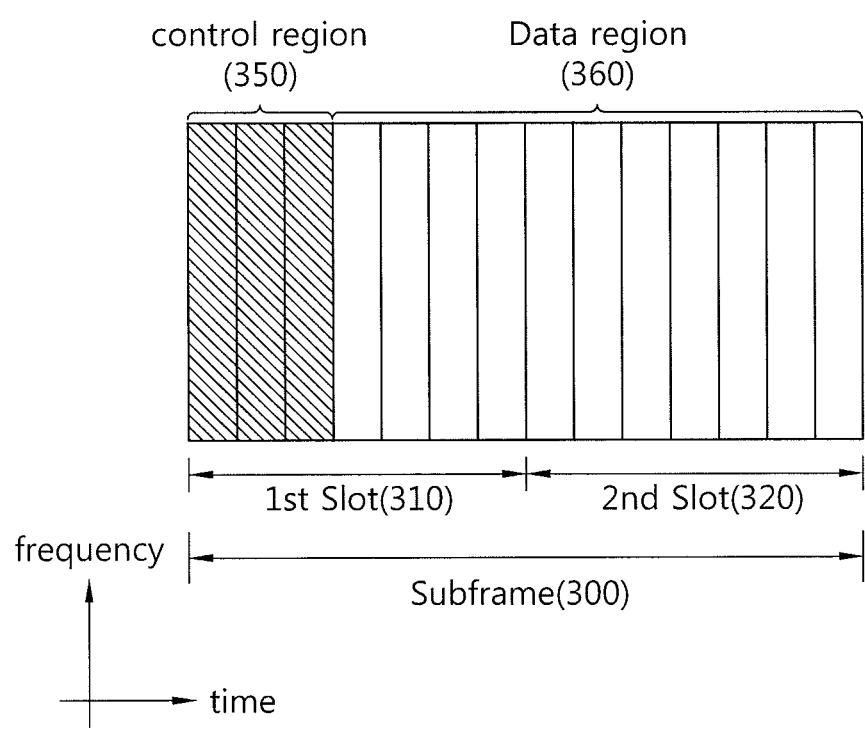
FIG. 3 shows a structure of a downlink subframe.

FIG. 3 shows a structure of a downlink subframe.

A downlink subframe 300 may be divided into two slots 310 and 320 according to a time. Each of the slots 310 and 320 includes 7 OFDM symbols in a normal CP case. A resource region corresponding to first three OFDM symbols (i.e., in case of 1.4 MHz bandwidth, up to 4 OFDM symbols) included in the first slot 310 of the subframe 300 may be used as a control region 350 to which control channels are allocated. The remaining OFDM symbols may be used as a data region 360 to which a traffic channel such as a PDSCH (physical downlink shared channel) is allocated.

A PDCCH (physical downlink control channel) may be a control channel for transmitting a resource allocation and transmission format of a DL-SCH (downlink-shared channel), resource allocation information of a UL-SCH (uplink shared channel), paging information on a PCH, system information on a DL-SCH, a resource allocation of a higher layer control message such as a random access response transmitted through a PDSCH, a transmission power control command for individual UEs included in any UE group, activation of a VoIP (voice over internet protocol), etc. A plurality of units of transmitting PDCCH data may be defined within the control region 350. The UE may acquire control data by monitoring the plurality of units of transmitting the PDCCH data. For example, the PDCCH data may be transmitted to the UE on the basis of an aggregation of one or several consecutive CCEs (control channel elements). The CCE may be one unit of transmitting the PDCCH data. The CCE may include a plurality of resource element groups. The resource element group is a resource unit including four available resource elements.

A BS determines a PDCCH format according to DCI (downlink control information) to be transmitted to a UE, and attaches a CRC (cyclic redundancy check) to control information. The CRC is masked with a unique identifier (referred to as an RNTI (radio network temporary identifier)) according to an owner or usage of the PDCCH. If the PDCCH is for a specific UE, a unique identifier (e.g., C-RNTI (cell-RNTI)) of the UE may be masked to the CRC. Alternatively, if the PDCCH is for a paging message, a paging indicator identifier (e.g., P-RNTI (paging-RNTI)) may be masked to the CRC. If the PDCCH is for an SIB (system information block), a system information identifier and an SI-RNTI (system information-RNTI) may be masked to the CRC. To indicate a random access response that is a response for transmission of a random access preamble of the UE, an RA-RNTI (random access-RNTI) may be masked to the CRC.

Figure 4:
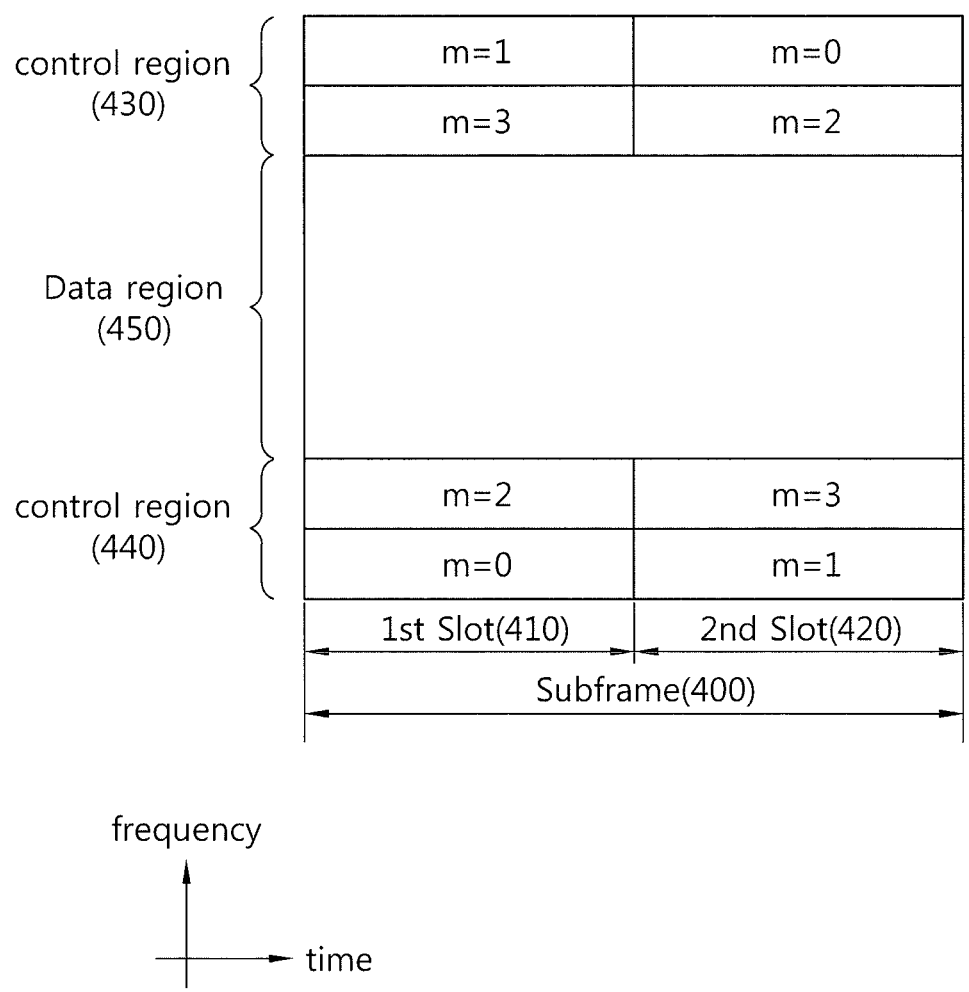
FIG. 4 shows a structure of an uplink subframe.

FIG. 4 shows a structure of an uplink subframe.

The uplink subframe may be divided into control regions 430 and 440 and a data region 450. A PUCCH (physical uplink control channel) for carrying uplink control information is allocated to the control regions 430 and 440. A PUSCH (physical uplink shared channel) for carrying data is allocated to the data region 450. When indicated by a higher layer, a UE may support simultaneous transmission of the PUSCH and the PUCCH.

The PUCCH for one UE is allocated in an RB (resource block) pair in a subframe. RBs belonging to the RB pair occupy different subcarriers in each of a 1st slot 410 and a 2nd slot 420. A frequency occupied by the RBs belonging to the RB pair changes at a slot boundary. This is called that the RB pair allocated to the PUCCH is frequency-hopped at the slot boundary. Since the UE transmits the UCI on a time basis through different subcarriers, a frequency diversity gain can be obtained. m is a location index indicating a logical frequency-domain location of the RB pair allocated to the PUCCH in the subframe.

Examples of uplink control information transmitted on a PUCCH may include HARQ (hybrid automatic repeat request) ACK (acknowledgement)/NACK (non-acknowledgement), CQI (channel quality indicator) indicating a downlink channel state, SR (scheduling request) which is an uplink radio resource allocation request, etc.

The PUSCH is a channel mapped to a UL-SCH (uplink shared channel) which is a transport channel. Uplink data transmitted through the PUSCH may be a transport block which is a data block for the UL-SCH transmitted during a TTI. The transport block may include user information. In addition, the uplink data may be multiplexed data. The multiplexed data may be obtained by multiplexing control information and a transport block for the UL-SCH. Examples of the control information multiplexed to the data may include CQI, PMI (precoding matrix indicator), HARQ ACK/NACK, RI (rank indicator), etc. Alternatively, the uplink data may consist of only the control information.

Figure 5:
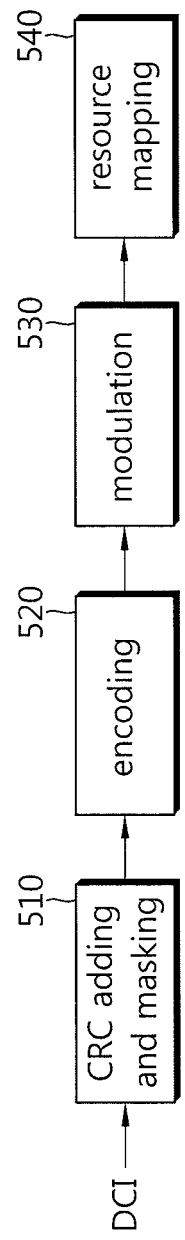
FIG. 5 is a block diagram showing a method of generating PDCCH (physical downlink control channel) data.

FIG. 5 is a block diagram showing a method of generating PDCCH data.

In FIG. 5, a method of generating PDCCH data is described in detail.

A UE performs blind decoding to detect a PDCCH. The blind decoding may be performed on the basis of an identifier masked to a CRC (cyclic redundancy check) of a received PDCCH (referred to as a candidate PDCCH). By checking an CRC error of the received PDCCH data, the UE may determine whether the PDCCH data is its own control data.

A BS determines a PDCCH format according to DCI (downlink control information) to be transmitted to the UE and thereafter attaches a CRC to the DCI, and masks a unique identifier (referred to as an RNTI (radio network temporary identifier)) to the CRC according to an owner or usage of the PDCCH (block 510).

If the PDCCH is for a specific UE, the BS may mask a unique identifier (e.g., C-RNTI (cell-RNTI)) of the UE to the CRC. Alternatively, if the PDCCH is for a paging message, the BS may mask a paging indication identifier (e.g., P-RNTI (paging-RNTI)) to the CRC. If the PDCCH is for system information, the BS may mask a system information identifier (e.g., SI-RNTI (system information-RNTI)) to the CRC. In addition thereto, the BS may mask an RA-RNTI (random access-RNTI) to the CRC in order to indicate a random access response that is a response for transmission of a random access preamble of the UE, and may mask a TPC-RNTI to the CRC in order to indicate a TPC (transmit power control) command for a plurality of UEs.

A PDCCH masked with the C-RNTI may transmit control information for a specific UE (such information is called UE-specific control information), and a PDCCH masked with a different RNTI may transmit common control information received by all or a plurality of UEs in a cell. A plurality of DCI formats may be defined to transmit PDCCH data. This will be additionally described in detail.

The BS encodes the CRC-attached DCI to generate coded data (block 520). Encoding includes channel encoding and rate matching.

The BS generates modulation symbols by performing modulation on the coded data (block 530).

The BS maps the modulation symbols to physical REs (resource elements) (block 540). The BS may map the modulation symbols to the respective REs.

As described above, a control region in a subframe includes a plurality of CCEs (control channel elements). The CCE is a logical allocation unit used to provide the PDCCH with a coding rate depending on a radio channel state, and corresponds to a plurality of REGs (resource element groups). The REG includes a plurality of resource elements. One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS may determine the number of CCEs used in transmission of the PDCCH according to a channel state. For example, if a downlink channel state is good, the BS may use one CCE to transmit PDCCH data to the UE. On the contrary, if the downlink channel state is not good, the BS may use 8 CCEs to transmit PDCCH data to the UE.

A control channel consisting of one or more CCEs may perform interleaving in an REG unit, and may be mapped to a physical resource after performing cyclic shift based on a cell ID (identifier).

Figure 6:
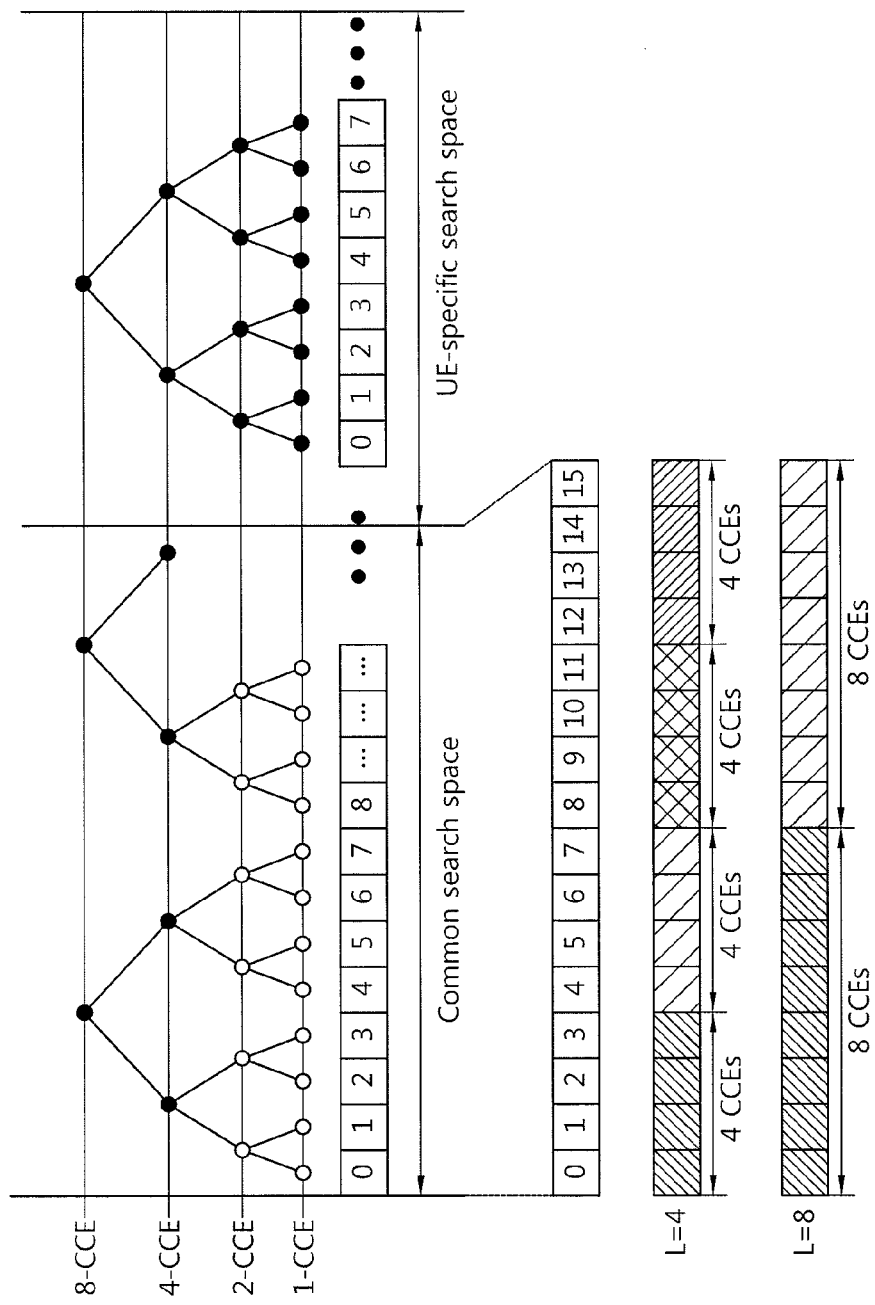
FIG. 6 shows an example of monitoring a PDCCH.

FIG. 6 shows an example of monitoring a PDCCH. The section 9 of 3GPP TS 36.213 V10.2.0 (2011-06) may be incorporated herein by reference.

A UE may perform blind decoding to detect the PDCCH. The blind decoding is a scheme in which a specific identifier is de-masked from a CRC of received PDCCH (referred to as candidate PDCCH) data and thereafter whether the PDCCH is its own control channel is determined by performing CRC error checking. The UE cannot know about a specific position in a control region in which its PDCCH data is transmitted and about a specific CCE aggregation level or DCI format used in transmission.

A plurality of PDCCHs may be transmitted in one subframe. The UE monitors the plurality of PDCCHs in every subframe. Herein, monitoring is an operation in which the UE attempts to perform blind decoding on the PDCCH.

The 3GPP LTE uses a search space to reduce an overload caused when the UE performs the blind decoding. The search space may also be called a monitoring set of a CCE for PDCCH searching. The UE may monitor the PDCCH on the basis of the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, 1A) for carrying UE-specific information may also be transmitted in the common search space. The UE-specific search space supports a PDCCH having a CCE aggregation level of {1, 2, 4, 8}.

Table 1 shows the number of PDCCH candidates monitored by the UE.

TABLE 1

| Search space $S_k^{(L)}$ | | Number of PDCCH candidates $M^{(L)}$ | DCI format |
|---|---|---|---|
| Type | Aggregation level L | Size [in CCEs] | | |
| UE-specific | 1 | 6 | 6 | 0, 1, 1A, 1B, 1D, 2, 2A |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

A size of search space is determined by Table 1 above, and a start point of the search space is defined differently in the common search space and the UE-specific search space. Although a start point of the common search space is fixed irrespective of a subframe, a start point of the UE-specific search space may vary in every subframe according to a UE identifier (e.g., C-RNTI), a CCE aggregation level, and/or a slot number in a radio frame. If the start point of the UE-specific search space exists in the common search space, the UE-specific search space and the common search space may overlap.

A set of PDCCH candidates monitored by the UE may be defined according to the search space. In the aggregation level 1, 2, 4, or 8, a search space is defined as the set of PDCCH candidates. In the search space, a CCE corresponding to a PDCCH candidate m is given by Equation 1 below.

$$L \cdot \{(Y_k + m') \bmod \lfloor N_{CCE,k}/L \rfloor\} + i \qquad \text{<Equation 1>}$$

Herein, i=0, ..., L−1. If the search space is a common search space, m'=m. If the search space is a UE-specific search space, m'=m+$M^{(L)}$·$n_{CI}$ when a CIF (carrier indicator field) is set to the UE, where $n_{CI}$ is a value of the set CIF. Further, m'=m when the CIF is not set to the UE. Herein, m=0, ..., $M^{(L)}$−1, where $M^{(L)}$ is the number of PDCCH candidates for monitoring a given search space.

In a common search space, $Y_k$ k is set to 0 with respect to two aggregation levels L=4 and L=8. In a UE-specific search space of the aggregation level L, a variable $Y_k$ is defined by Equation 2 below.

$$Y_k = (A \cdot Y_{k-1}) \bmod D \qquad \text{<Equation 2>}$$

Herein, $Y_{-1}$=$n_{RNTI}$≠0, A=39827, D=65537, k=$\lfloor n_s/2 \rfloor$. ns denotes a slot number in a radio frame.

When a wireless device monitors a PDCCH on the basis of a C-RNTI, a search space and a DCI format to be monitored are determined according to a transmission mode of a PDSCH. Table 2 below shows an example of PDCCH monitoring in which the C-RNTI is set.

TABLE 2

| Transmission mode | DCI format | search space | Transmission mode of PDSCH based on PDCCH |
|---|---|---|---|
| Mode 1 | DCI format 1A | common and UE specific | Single antenna port, port 0 |
| | DCI format 1 | UE specific | Single antenna port, port 0 |
| Mode 2 | DCI format 1A | common and UE specific | Transmit diversity |
| | DCI format 1 | UE specific | Transmit diversity |
| Mode 3 | DCI format 1A | common and UE specific | Transmit diversity |
| | DCI format 2A | UE specific | CDD (Cyclic Delay Diversity) or Transmit diversity |
| Mode 4 | DCI format 1A | common and UE specific | Transmit diversity |
| | DCI format 2 | UE specific | Closed-loop spatial multiplexing |
| Mode 5 | DCI format 1A | common and UE specific | Transmit diversity |
| | DCI format 1D | UE specific | MU-MIMO (Multi-user Multiple Input Multiple Output) |
| Mode 6 | DCI format 1A | common and UE specific | Transmit diversity |
| | DCI format 1B | UE specific | Closed-loop spatial multiplexing |
| Mode 7 | DCI format 1A | common and UE specific | If the number of PBCH transmission ports is 1, single antenna port, port 0, otherwise Transmit diversity |
| | DCI format 1 | UE specific | Single antenna port, port 5 |
| Mode 8 | DCI format 1A | common and UE specific | If the number of PBCH transmission ports is 1, single antenna port, port 0, otherwise, Transmit diversity |
| | DCI format 2B | UE specific | Dual layer transmission (port 7 or 8), or single antenna port, port 7 or 8 |

The usage of the DCI format is classified as shown in Table 3 below.

TABLE 3

| DCI format | Contents |
|---|---|
| DCI format 0 | It is used for PUSCH scheduling. |
| DCI format 1 | It is used for scheduling of one PDSCH codeword. |
| DCI format 1A | It is used for compact scheduling and random access process of one PDSCH codeword. |
| DCI format 1B | It is used in simple scheduling of one PDSCH codeword having precoding information. |
| DCI format 1C | It is used for very compact scheduling of one PDSCH codeword. |
| DCI format 1D | It is used for simple scheduling of one PDSCH codeword having precoding and power offset information. |
| DCI format 2 | It is used for PDSCH scheduling of UEs configured to a closed-loop spatial multiplexing mode. |
| DCI format 2A | It is used for PDSCH scheduling of UEs configured to an open-loop spatial multiplexing mode. |

TABLE 3-continued

| DCI format | Contents |
|---|---|
| DCI format 3 | It is used for transmission of a TPC command of a PUCCH and a PUSCH having a 2-bit power adjustment. |
| DCI format 3A | It is used for transmission of a TPC command of a PUCCH and a PUSCH having a 1-bit power adjustment. |

According to an RNTI masked to a CRC used when DCI is generated, a search space and a DCI format to be used may be set differently. Table 4 below shows a search space and a DCI format of a control channel used when SI-RNTI, P-RNTI, or RA-RNTI is masked to the CRC of the DCI.

TABLE 4

| DCI format | search space | Transmission mode of PDSCH based on PDCCH |
|---|---|---|
| DCI format 1C | common | If the number of PBCH transmission ports is 1, single antenna port, port 0, otherwise Transmit diversity |
| DCI format 1A | common | If the number of PBCH transmission ports is 1, single antenna port, port 0, otherwise Transmit diversity |

Table 5 below shows a DCI format and a search space of a control channel used when SPS-C-RNT is masked to the CRC of the DCI.

TABLE 5

| Transmission mode | DCI format | search space | Transmission mode of PDSCH based on PDCCH |
|---|---|---|---|
| Mode 1 | DCI format 1A | common and UE specific | Single antenna port, port 0 |
|  | DCI format 1 | UE specific | Single antenna port, port 0 |
| Mode 2 | DCI format 1A | common and UE specific | Transmit diversity |
|  | DCI format 1 | UE specific | Transmit diversity |
| Mode 3 | DCI format 1A | common and UE specific | Transmit diversity |
|  | DCI format 2A | UE specific | Transmit diversity |
| Mode 4 | DCI format 1A | common and UE specific | Transmit diversity |
|  | DCI format 2 | UE specific | Transmit diversity |
| Mode 5 | DCI format 1A | common and UE specific | Transmit diversity |
| Mode 6 | DCI format 1A | common and UE specific | Transmit diversity |
| Mode 7 | DCI format 1A | common and UE specific | Single antenna port, port 5 |
|  | DCI format 1 | UE specific | Single antenna port, port 5 |
| Mode 8 | DCI format 1A | common and UE specific | Single antenna port, port 7 |
|  | DCI format 2B | UE specific | Single antenna port, port 7 or 8 |
| Mode 9 | DCI format 1A | common and UE specific | Single antenna port, port 7 |
|  | DCI format 2C | UE specific | Single antenna port, port 7 or 8 |
| Mode 10 | DCI format 1A | common and UE specific | Single antenna port, port 7 |
|  | DCI format 2D | UE specific | Single antenna port, port 7 or 8 |

Table 6 below shows a DCI format and a search area of a control channel used when temporary C-RNTI is masked to the CRC of the DCI.

TABLE 6

| DCI format | search space | Transmission mode of PDSCH based on PDCCH |
|---|---|---|
| DCI format 1A | common and UE specific | If the number of PBCH transmission ports is 1, single antenna port, port 0, otherwise Transmit diversity |
| DCI format 1 | UE specific | If the number of PBCH transmission ports is 1, single antenna port, port 0, otherwise Transmit diversity |

Figure 7:
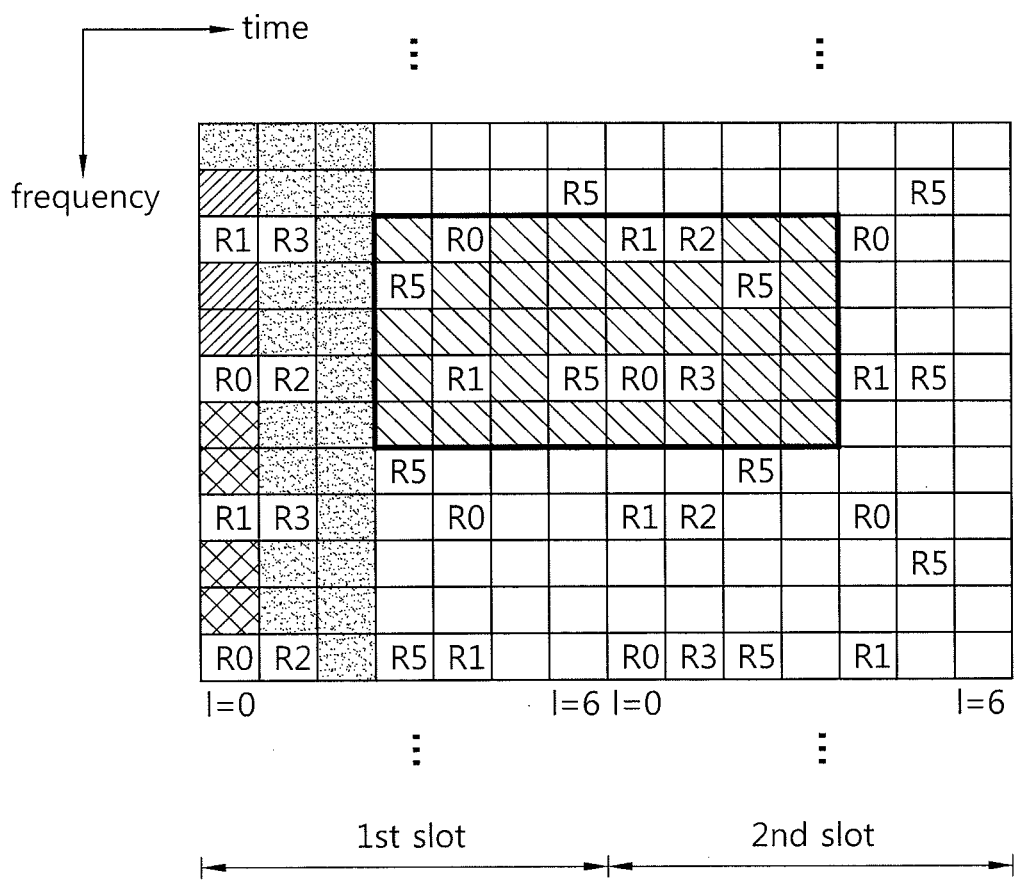
FIG. 7 shows a downlink subframe to which a reference signal and a control channel are allocated in 3GPP (3rd generation partnership project) LTE.

FIG. 7 shows a downlink subframe to which a reference signal and a control channel are allocated in 3GPP LTE.

The downlink subframe may be divided into a control region and a data region. For example, in the downlink subframe, the control region (or a PDCCH region) includes first three OFDM symbols, and the data region in which a PDSCH is transmitted includes the remaining OFDM symbols.

A PCFICH, a PHICH, and/or a PDCCH are transmitted in the control region.

A PHICH (physical HARQ ACK/NACK indicator channel) may transmit HARQ (hybrid automatic retransmission request) information in response to uplink transmission.

A PCFICH (physical control format indicator channel) may transmit information regarding the number of OFDM symbols allocated to the PDCCH. For example, a control format indictor (CFI) of the PCFICH may indicate three OFDM symbols. A region excluding a resource in which the PCFICH and/or the PHICH are transmitted in the control region is a PDCCH region in which the UE monitors the PDCCH.

Various reference signals may be transmitted in the subframe.

A CRS (cell-specific reference signal) is a reference signal that can be received by all UEs in a cell, and may be transmitted across a full downlink frequency band. In FIG. 6, 'R0' indicates an RE used to transmit a CRS for a first antenna port, 'R1' indicates an RE used to transmit a CRS for a second antenna port, 'R2' indicates an RE used to transmit a CRS for a third antenna port, and 'R3' indicates an RE used to transmit a CRS for a fourth antenna port.

An RS sequence $r_{l,n_s}(m)$ for a CRS is defined as follows.

<Equation 3>

$$r_{l,ns}(m) = \frac{1}{\sqrt{2}}(1 - 2 \cdot c(2m)) + j\frac{1}{\sqrt{2}}(1 - 2 \cdot c(2m+1))$$

Herein, m=0, 1, . . . , $2N_{RB}^{max,DL}-1$. $N_{RB}^{max,DL}$ is the maximum number of RBs. ns is a slot number in a radio frame. 1 is an OFDM symbol index in a slot.

A pseudo-random sequence is defined by a length-31 gold sequence as follows.

$c(n)=(x_1(n+Nc)+x_2(n+Nc))\mod 2$ $x_1(n+31)=(x_1(n+3)+x_1(n))\mod 2$ $x_2(n+31)=(x_2(n+3)+x_2(n+2)+x_2(n+1)+x_2(n))\mod 2$  <Equation 4>

Herein, Nc=1600, and a first m-sequence is initialized as x1(0)=1, x1(n)=0, n=1, 2, . . . , 30. A second m-sequence is initialized as $c_{init}=2^{10} \cdot (7 \cdot (n_s+1)+l+1) \cdot (2 \cdot N_{ID}^{cell}+1)+2 \cdot N_{ID}^{cell}+N_{CP}$ at a start of each OFDM symbol. $N_{ID}^{cell}$ is a physical cell identifier (PCI). $N_{CP}$ is set to $N_{CP}=1$ in a normal CP case, and is set to $N_{CP}=0$ in an extended CP case.

In addition, a URS (UE-specific Reference Signal) may be transmitted in the subframe. Whereas the CRS is transmitted in a full region of the subframe, the URS is a reference signal transmitted in a data region of the subframe and is used to demodulate the PDSCH. In FIG. 7, 'R5' indicates an RE used to transmit the URS. A DM-RS is a reference signal used to demodulate EPDCCH data.

The URS may be transmitted in an RB in which resource mapping is performed on corresponding PDSCH data. Although R5 is indicated in FIG. 7 in addition to a region in which the PDSCH data is transmitted, this is for indicating a location of an RE to which the URS is mapped.

The URS may be a reference signal which is demodulated only by a specific UE. An RS (reference signal) sequence $r_{l,n_s}(m)$ for the URS is equivalent to Equation 3. In this case, $m=0, 1, \ldots, 12N_{RB}^{PDSCH}-1$, and $N_{RB}^{PDSCH}$ is the number of RBs used for transmission of a corresponding PDSCH. If the URS is transmitted through a single antenna, a pseudo-random sequence generator is initialized as $c_{init}=(\lfloor n_s/2 \rfloor+1) \cdot (2N_{ID}^{cell}+1) \cdot 2^{16}+n_{RNTI}$ at a start of each subframe. $n_{RNTI}$ is an identifier of a wireless device.

The aforementioned initialization method is for a case where the URS is transmitted through the single antenna, and when the URS is transmitted through multiple antennas, the pseudo-random sequence generator is initialized as $c_{init}=(\lfloor n_s/2 \rfloor+1) \cdot (2n_{ID}^{(n_{SCID})}+1) \cdot 2^{16}+n_{SCID}$ at a start of each subframe. $n^{SCID}$ is a parameter acquired from a DL (downlink) grant (e.g., a DCI format 2B or 2C) related to PDSCH transmission.

The URS supports MIMO (Multiple Input Multiple Output) transmission. According to an antenna port or a layer, an RS sequence for the URS may be spread into a spread sequence as follows.

TABLE 7

| Layer | [ w(0) w(1) w(2) w(3) ] |
| --- | --- |
| 1 | [ +1 +1 +1 +1 ] |
| 2 | [ +1 −1 +1 −1 ] |
| 3 | [ +1 +1 +1 +1 ] |
| 4 | [ +1 −1 +1 −1 ] |
| 5 | [ +1 +1 −1 −1 ] |
| 6 | [ −1 −1 +1 +1 ] |
| 7 | [ +1 −1 −1 +1 ] |
| 8 | [ −1 +1 +1 −1 ] |

A layer may be defined as an information path which is input to a precoder. A rank is a non-zero eigenvalue of a MIMO channel matrix, and is equal to the number of layers or the number of spatial streams. The layer may correspond to an antenna port for identifying a URS and/or a spread sequence applied to the URS.

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease an overhead caused by CRS transmission, an EPDCCH (enhanced PDCCH) is introduced.

Figure 8:
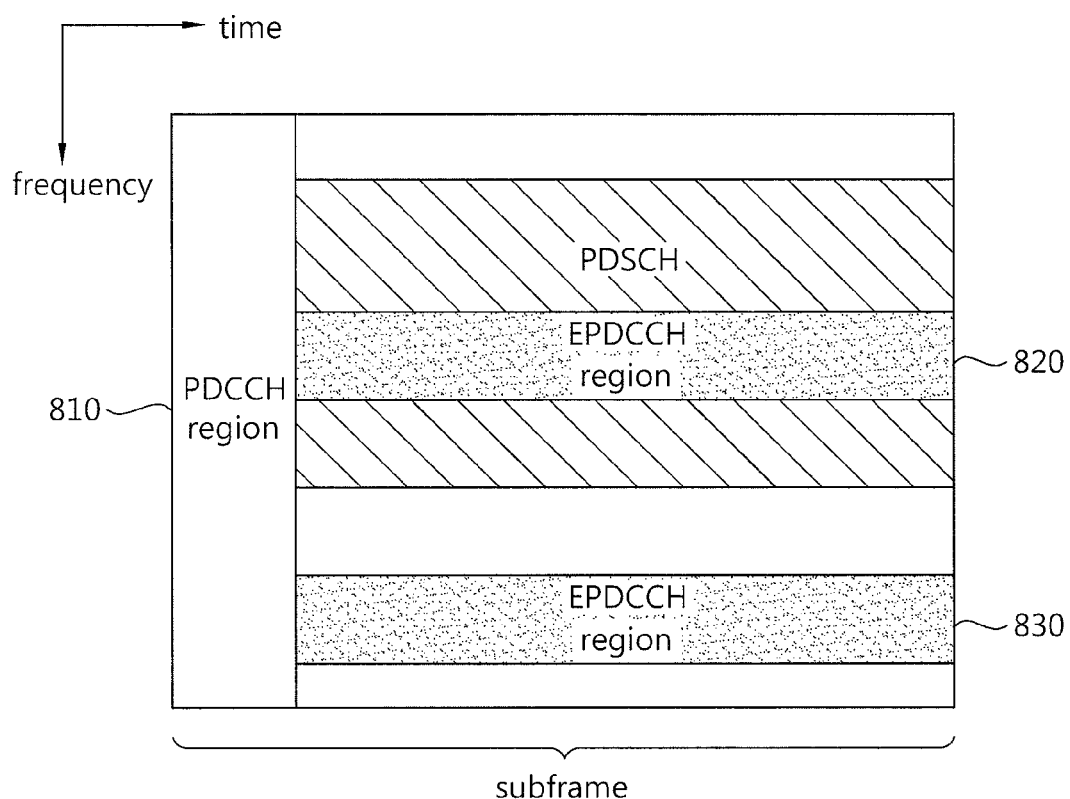
FIG. 8 is an example of a subframe having an EPDCCH (enhanced PDCCH).

FIG. 8 is an example of a subframe having an EPDCCH.

The subframe may include zero or one PDCCH region 810 and zero or more EPDCCH regions 820 and 830.

The EPDCCH regions 820 and 830 are regions in which a UE monitors the EPDCCH. The PDCCH region 810 is located in first three or up to 4 OFDM symbols of the subframe, whereas the EPDCCH regions 820 and 830 may be flexibly scheduled in an OFDM symbol located after the PDCCH region 810.

One or more EPDCCH regions 820 and 830 may be assigned to the UE. The UE may monitor EPDDCH data in the assigned EPDCCH regions 820 and 830.

The number/location/size of the EPDCCH regions 820 and 830 and/or information regarding a subframe for monitoring the EPDCCH may be reported by a BS to the UE by using an RRC (radio resource control) message or the like.

In the PDCCH region 810, a PDCCH may be demodulated on the basis of a CRS. In the EPDCCH regions 820 and 830, instead of the CRS, a DM-RS may be defined for demodulation of the EPDCCH. The DM-RS may be transmitted in corresponding EPDCCH regions 820 and 830.

An RS sequence for the DM-RS is equivalent to Equation 3. In this case, $m=0, 1, \ldots, 12N_{RB}^{max,DL}-1$, and $N_{RB}^{max,DL}$ is a maximum number of RBs. A pseudo-random sequence generator may be initialized as $c_{init}=(\lfloor n_s/2 \rfloor+1) \cdot (2n_{ID,i}^{EPDCCH}+1) \cdot 2^{16}+n_{SCID}^{EPDCCH}$ at a start of each subframe. ns is a slot number of a radio frame. $n_{ID,i}^{EPDCCH}$ is a cell index related to a corresponding EPDCCH region. $n_{SCID}^{EPDCCH}$ is a parameter given from higher layer signaling.

Each of the EPDCCH regions 820 and 830 may be used to schedule a different cell. For example, an EPDCCH in the EPDCCH region 820 may carry scheduling information for a primary cell, and an EPDCCH in the EPDCCH region 830 may carry scheduling information for a secondary cell.

When the EPDCCH is transmitted through multiple antennas in the EPDCCH regions 820 and 830, the same precoding as that used in the EPDCCH may be applied to a DM-RS in the EPDCCH regions 820 and 830.

Comparing with a case where the PDCCH uses a CCE as a transmission resource unit, a transmission resource unit for the EPDCCH is called an ECCE (Enhanced Control Channel Element). An aggregation level may be defined as a resource unit for monitoring the EPDCCH. For example, when 1 ECCE is a minimum resource for the EPDCCH, it may be defined as an aggregation level L={1, 2, 4, 8, 16}. A search space may also be defined in an EPDCCH region. The UE may monitor an EPDCCH candidate on the basis of the aggregation level.

Figure 9:
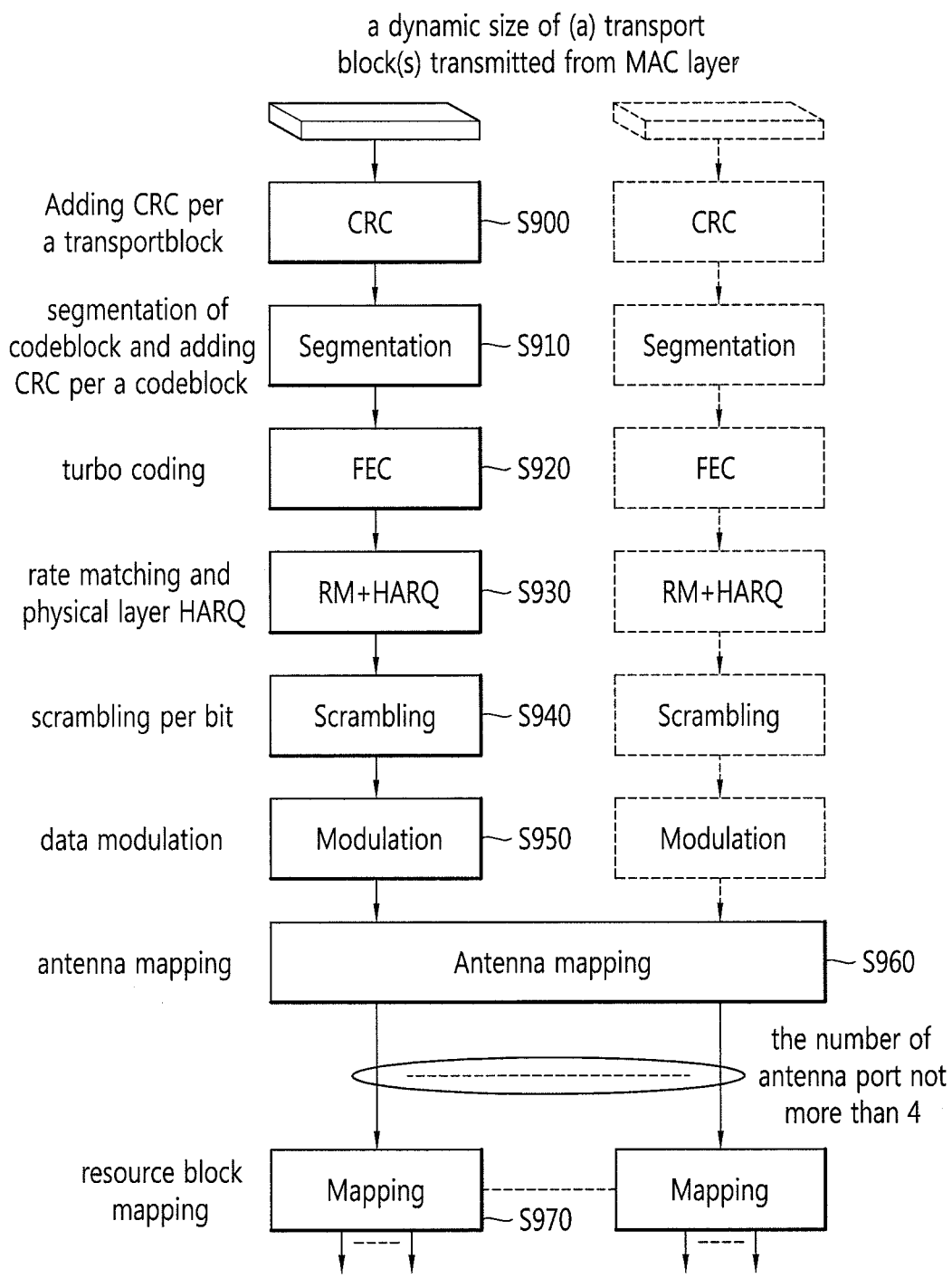
FIG. 9 shows the concept of a method of processing a downlink transport channel according to an embodiment of the present invention.

FIG. 9 shows the concept of a method of processing a downlink transport channel according to an embodiment of the present invention.

In FIG. 9, an operation of delivering a transport block to a physical layer via a transport channel is described.

An LTE physical layer uses a higher layer, i.e., a MAC layer and a transport channel, to provide an interface. In case of single-antenna transmission, one transport block having a dynamic size exists for each TTI (transmission time interval). For example, in case of multi-antenna transmission, a transport block having a dynamic size may exist in plural (e.g., up to two) for each TTI.

Figure 14:
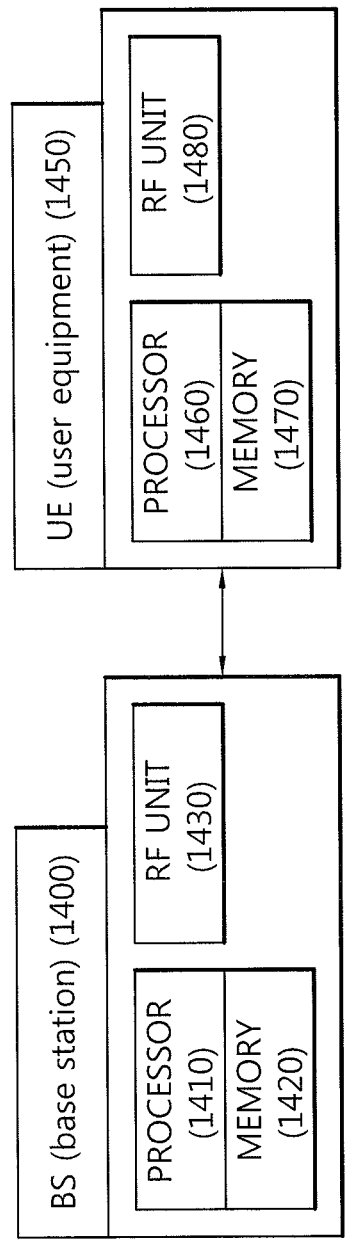
FIG. 14 is a block diagram of a wireless communication system according to an embodiment of the present invention.

In FIG. 9, a processing procedure for DL-SCH transmission is described when performing an LTE downlink transmission process. A second processing procedure corresponding to a second transport block exists only in case of downlink spatial multiplexing. In the case of downlink spatial multiplexing, two transport blocks each having a different size may be combined through antenna mapping in general. Hereinafter, an LTE downlink transport channel processing method of FIG. 14 is described.

(1) Inserting CRC Per Transport Block

In a first step of transport channel processing, a 24-bit CRC may be calculated and attached to each transport block. By using the CRC, an error may be detected in a decoded transport block in a receiving end. When the detected error is reported and thus retransmission is requested, for example, a downlink HARQ protocol may be used.

(2) Segmenting Code Block and Inserting CRC Per Transport Block

An internal interleaver of an LTE turbo code may be restricted in a size thereof, and thus may be defined only for a code block size of which a maximum block size is limited to a specific bit. If a size of a transport block including a CRC attached to the transport block exceeds a maximum code block size, code block segmentation may be performed before turbo coding. The segmentation of the code block implies that the transport block is divided into smaller sized code blocks to conform to code block sizes defined in a turbo code.

Figure 10:
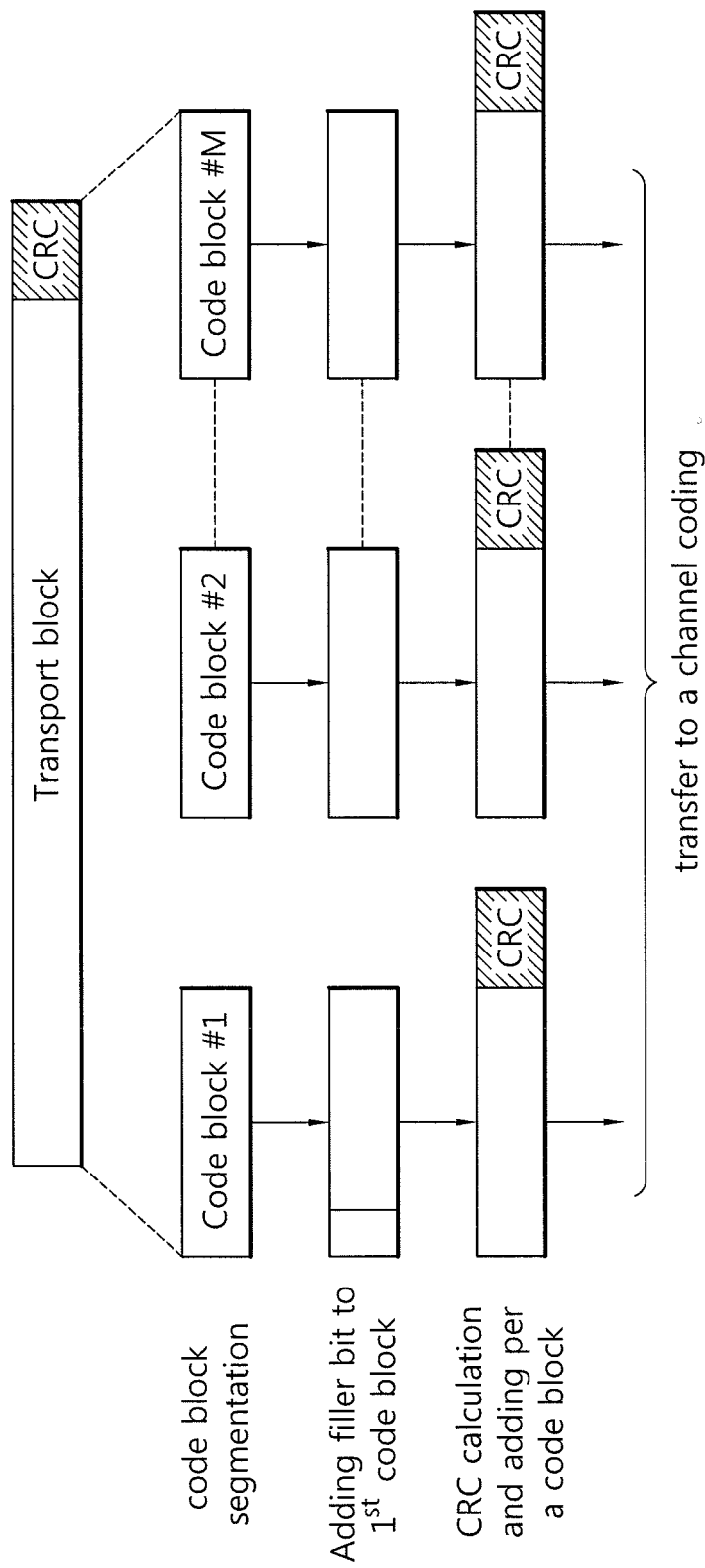
FIG. 10 shows the concept of a method of performing code block segmentation.

FIG. 10 shows the concept of a method of performing code block segmentation.

Referring to FIG. 10, code block segmentation may imply that an additional CRC is calculated and attached for each code block. A code block which is correctly coded can be known more rapidly when each code block has a CRC. Accordingly, iterative decoding on a corresponding code block can be finished more rapidly. Therefore, processing power consumption of a UE can be decreased. If one transport block is one code block in the absence of the code block segmentation, the CRC may not be added to the code block.

In the presence of the code block segmentation, whether the entirety of the transport block is correctly received can also be known indirectly from each of code block CRCs. In addition, by performing additional error detection based on the transport block CRC, it is possible to decrease a risk in which an error is not detected from a decoded transport block.

(3) Turbo Coding

In LTE, the existing WCDMA/HSPA turbo encoder internal interleaver is replaced with QPP (quadrature permutation polynomial)-based interleaving. Unlike the interleaver of the WCDMA/HSPA turbo code, the QPP-based interleaver is a maximum contention-free interleaver, and thus parallelization of a decoding process is possible simply without a collision risk even if different parallel processes access to an interleaver memory.

(4) Rate Matching and Physical Layer HARQ Function

Rate matching and physical layer HARQ take a role of correctly determining bits to be transmitted within a given TTI from blocks of code bits delivered from a channel encoder. Outputs of the turbo encoder (i.e., systematic bits, first parity bits, and second parity bits) may be preferentially interleaved respectively. The interleaved bits may enter to a circular buffer. A bit selection block extracts consecutive bits from the circular buffer by an amount of allocated resources.

Figure 11:
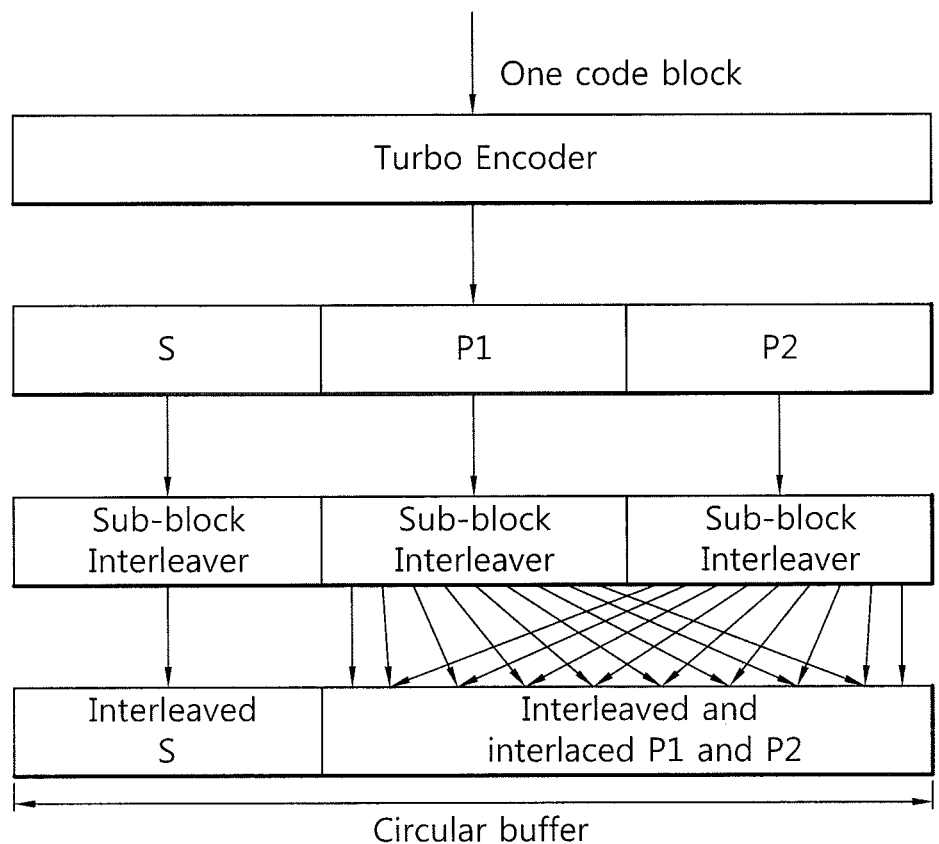
FIG. 11 shows the concept of a method of performing rate matching.

FIG. 11 shows the concept of a method of performing rate matching.

Referring to FIG. 11, since a constant amount of radio resources are used in actual transmission, to cope with this situation, rate matching must be performed on an encoded code block. In general, the rate matching is achieved through puncturing or repetition. The rate matching may be performed in unit of an encoded code block such as WCDMA of 3GPP. It is shown in FIG. 11 that the method is performed separately on a system bit part and a parity bit part of the encoded code block. It is assumed herein that a code rate is 1/3.

(5) Bit-Based Scrambling

LTE downlink scrambling implies that a block of code bits subjected to rate matching and HARQ is multiplied by a bit-based scrambling sequence. In LTE, downlink scrambling may be applied to a coded bit of each transport channel.

(6) Data Modulation

Downlink data modulation indicates a process of converting scrambled bits into complex-valued modulation symbols. Examples of a modulation scheme supported in an LTE downlink include QPSK, 16QAM, and 64QAM. Hereinafter, a case where 256 QAM is additionally supported as the modulation scheme will be described in the exemplary embodiment of the present invention. The modulation scheme may use 2 bits, 4 bits, and 6 bits respectively for QPSK, 16QAM, and 64QAM. Different modulation schemes may be used according to a transport channel.

(7) Antenna Mapping

In general, antenna mapping takes a role of simultaneously processing modulation symbols corresponding to two transport blocks and of mapping results thereof to different antenna ports.

(8) Resource Block Mapping

Resource block mapping takes a role of mapping symbols to be transmitted to respective antenna ports to a resource element of resource blocks allocated to transport blocks transmitted to a UE by using a MAC scheduler.

Some resource elements in the resource block are preoccupied by different antenna ports or control regions, and such resource elements cannot be used.

A BS may use a downlink control channel (e.g., PDCCH, EPDCCH) to deliver a data block size to a UE. Information on the data block size transmitted through a PDSCH may be transmitted based on resource allocation information and MCS which is modulation and coding rate related information. For an MCS field, MCS information may be transmitted to the UE on the basis of 5 bits for example. For resource allocation, one RB to 110 RBs may be allocated. If all of the 5 bits of the MCS field are used to transmit the MCS information without having to use MIMO, 32 pieces of MCS information may be transmitted based on the 5 bits. In this case, signaling is possible for a data block size corresponding to 32×110. However, since 3 pieces of MCS information out of the 32 pieces of MCS information are used to indicate a change of a modulation scheme when performing retransmission, signaling is actually possible for a data block size corresponding to 29×110. The data block may imply a transport block.

QPSK, 16QAM, and 64QAM may be used as a modulation scheme supported in the existing LTE system. At a switching point at which the modulation scheme is changed, the same data block size may be indicated when the same resource is allocated. This is to effectively perform an operation in various channel environments. In order to indicate an actual data block size, IMCS which is MCS related information transmitted through a downlink control channel may be mapped to ITBS which is another variable for indicating a data block size. Table 8 below shows a relation between IMCS and ITBS.

TABLE 8

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |

TABLE 8-continued

| MCS Index $I_{MCS}$ | Modulation Order $Q_m$ | TBS Index $I_{TBS}$ |
|---|---|---|
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

The transport block size transmitted in a downlink may be determined by combining a resource allocation and an MCS field transmitted through the downlink control channel. Table 9 and Table 10 below respectively show a transport block size in the aforementioned IMCS-to-ITBS relation of Table 8 respectively for resource allocation of 1 RB to 10 RBs and resource allocation of 101 RBs to 110 RBs.

TABLE 9

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

TABLE 10

| $I_{TBS}$ | $N_{PRB}$ | | | | | | | | | |
|---|---|---|---|---|---|---|---|---|---|---|
| | 101 | 102 | 103 | 104 | 105 | 106 | 107 | 108 | 109 | 110 |
| 0 | 2792 | 2856 | 2856 | 2856 | 2984 | 2984 | 2984 | 2984 | 2984 | 3112 |
| 1 | 3752 | 3752 | 3752 | 3752 | 3880 | 3880 | 3880 | 4008 | 4008 | 4008 |
| 2 | 4584 | 4584 | 4584 | 4584 | 4776 | 4776 | 4776 | 4776 | 4968 | 4968 |
| 3 | 5992 | 5992 | 5992 | 5992 | 6200 | 6200 | 6200 | 6200 | 6456 | 6456 |
| 4 | 7224 | 7224 | 7480 | 7480 | 7480 | 7480 | 7736 | 7736 | 7736 | 7992 |
| 5 | 8760 | 9144 | 9144 | 9144 | 9144 | 9528 | 9528 | 9528 | 9528 | 9528 |
| 6 | 10680 | 10680 | 10680 | 10680 | 11064 | 11064 | 11064 | 11448 | 11448 | 11448 |
| 7 | 12216 | 12576 | 12576 | 12576 | 12960 | 12960 | 12960 | 12960 | 13536 | 13536 |
| 8 | 14112 | 14112 | 14688 | 14688 | 14688 | 14688 | 15264 | 15264 | 15264 | 15264 |
| 9 | 15840 | 16416 | 16416 | 16416 | 16416 | 16992 | 16992 | 16992 | 16992 | 17568 |
| 10 | 17568 | 18336 | 18336 | 18336 | 18336 | 18336 | 19080 | 19080 | 19080 | 19080 |
| 11 | 20616 | 20616 | 20616 | 21384 | 21384 | 21384 | 21384 | 22152 | 22152 | 22152 |
| 12 | 22920 | 23688 | 23688 | 23688 | 23688 | 24496 | 24496 | 24496 | 24496 | 25456 |
| 13 | 26416 | 26416 | 26416 | 26416 | 27376 | 27376 | 27376 | 27376 | 28336 | 28336 |
| 14 | 29296 | 29296 | 29296 | 29296 | 30576 | 30576 | 30576 | 30576 | 31704 | 31704 |
| 15 | 30576 | 31704 | 31704 | 31704 | 31704 | 32856 | 32856 | 32856 | 34008 | 34008 |
| 16 | 32856 | 32856 | 34008 | 34008 | 34008 | 34008 | 35160 | 35160 | 35160 | 35160 |
| 17 | 36696 | 36696 | 36696 | 37888 | 37888 | 37888 | 39232 | 39232 | 39232 | 39232 |
| 18 | 40576 | 40576 | 40576 | 40576 | 42368 | 42368 | 42368 | 42368 | 43816 | 43816 |
| 19 | 43816 | 43816 | 43816 | 45352 | 45352 | 45352 | 46888 | 46888 | 46888 | 46888 |
| 20 | 46888 | 46888 | 48936 | 48936 | 48936 | 48936 | 48936 | 51024 | 51024 | 51024 |
| 21 | 51024 | 51024 | 51024 | 52752 | 52752 | 52752 | 52752 | 55056 | 55056 | 55056 |
| 22 | 55056 | 55056 | 55056 | 57336 | 57336 | 57336 | 57336 | 59256 | 59256 | 59256 |
| 23 | 57336 | 59256 | 59256 | 59256 | 59256 | 61664 | 61664 | 61664 | 61664 | 63776 |
| 24 | 61664 | 61664 | 63776 | 63776 | 63776 | 63776 | 66592 | 66592 | 66592 | 66592 |
| 25 | 63776 | 63776 | 66592 | 66592 | 66592 | 66592 | 68808 | 68808 | 68808 | 71112 |
| 26 | 75376 | 75376 | 75376 | 75376 | 75376 | 75376 | 75376 | 75376 | 75376 | 75376 |

In the embodiment of the present invention, a method of determining a size of transport block (or data block) is described when 256QAM is supported as a modulation scheme other than QPSK, 16QAM, and 64QAM supported in the existing LTE system.

The size of transport block may be determined by distinguishing a case where the transport block is subjected to channel coding as a single code block without being segmented in a process of code block segmentation and per-code block CRC insertion and a case where the transport block is subjected to channel coding by being segmented into multiple code blocks. If the transport block size including a CRC attached to the transport block exceeds a maximum code block size, the code block segmentation may be performed before turbo coding. The segmentation of code block implies that the transport block is segmented into smaller-sized code blocks to conform to a code block size defined in the turbo code.

In a case where channel coding is performed with the single code block without being segmented in the process of code block segmentation and per-code block CRC insertion, the transport block size may be determined according to an internal interleaver size of a turbo code in order not to attach a dummy bit to the code block.

Table 11 below shows the size of the turbo code internal interleaver.

TABLE 11

| i | L | i | L | i | L | i | L |
|---|---|---|---|---|---|---|---|
| 1 | 40 | 48 | 416 | 95 | 1120 | 142 | 3200 |
| 2 | 48 | 49 | 424 | 96 | 1152 | 143 | 3264 |
| 3 | 56 | 50 | 432 | 97 | 1184 | 144 | 3328 |
| 4 | 64 | 51 | 440 | 98 | 1216 | 145 | 3392 |
| 5 | 72 | 52 | 448 | 99 | 1248 | 146 | 3456 |
| 6 | 80 | 53 | 456 | 100 | 1280 | 147 | 3520 |
| 7 | 88 | 54 | 464 | 101 | 1312 | 148 | 3584 |
| 8 | 96 | 55 | 472 | 102 | 1344 | 149 | 3648 |
| 9 | 104 | 56 | 480 | 103 | 1376 | 150 | 3712 |
| 10 | 112 | 57 | 488 | 104 | 1408 | 151 | 3776 |
| 11 | 120 | 58 | 496 | 105 | 1440 | 152 | 3840 |
| 12 | 128 | 59 | 504 | 106 | 1472 | 153 | 3904 |
| 13 | 136 | 60 | 512 | 107 | 1504 | 154 | 3968 |
| 14 | 144 | 61 | 528 | 108 | 1536 | 155 | 4032 |
| 15 | 152 | 62 | 544 | 109 | 1568 | 156 | 4096 |
| 16 | 160 | 63 | 560 | 110 | 1600 | 157 | 4160 |
| 17 | 168 | 64 | 576 | 111 | 1632 | 158 | 4224 |
| 18 | 176 | 65 | 592 | 112 | 1664 | 159 | 4288 |
| 19 | 184 | 66 | 608 | 113 | 1696 | 160 | 4352 |
| 20 | 192 | 67 | 624 | 114 | 1728 | 161 | 4416 |
| 21 | 200 | 68 | 640 | 115 | 1760 | 162 | 4480 |
| 22 | 208 | 69 | 656 | 116 | 1792 | 163 | 4544 |
| 23 | 216 | 70 | 672 | 117 | 1824 | 164 | 4608 |
| 24 | 224 | 71 | 688 | 118 | 1856 | 165 | 4672 |
| 25 | 232 | 72 | 704 | 119 | 1888 | 166 | 4736 |
| 26 | 240 | 73 | 720 | 120 | 1920 | 167 | 4800 |
| 27 | 248 | 74 | 736 | 121 | 1952 | 168 | 4864 |
| 28 | 256 | 75 | 752 | 122 | 1984 | 169 | 4928 |
| 29 | 264 | 76 | 768 | 123 | 2016 | 170 | 4992 |
| 30 | 272 | 77 | 784 | 124 | 2048 | 171 | 5056 |
| 31 | 280 | 78 | 800 | 125 | 2112 | 172 | 5120 |
| 32 | 288 | 79 | 816 | 126 | 2176 | 173 | 5184 |
| 33 | 296 | 80 | 832 | 127 | 2240 | 174 | 5248 |
| 34 | 304 | 81 | 848 | 128 | 2304 | 175 | 5312 |
| 35 | 312 | 82 | 864 | 129 | 2368 | 176 | 5376 |
| 36 | 320 | 83 | 880 | 130 | 2432 | 177 | 5440 |
| 37 | 328 | 84 | 896 | 131 | 2496 | 178 | 5504 |
| 38 | 336 | 85 | 912 | 132 | 2560 | 179 | 5568 |
| 39 | 344 | 86 | 928 | 133 | 2624 | 180 | 5632 |
| 40 | 352 | 87 | 944 | 134 | 2688 | 181 | 5696 |
| 41 | 360 | 88 | 960 | 135 | 2752 | 182 | 5760 |
| 42 | 368 | 89 | 976 | 136 | 2816 | 183 | 5824 |
| 43 | 376 | 90 | 992 | 137 | 2880 | 184 | 5888 |
| 44 | 384 | 91 | 1008 | 138 | 2944 | 185 | 5952 |
| 45 | 392 | 92 | 1024 | 139 | 3008 | 186 | 6016 |
| 46 | 400 | 93 | 1056 | 140 | 3072 | 187 | 6080 |
| 47 | 408 | 94 | 1088 | 141 | 3136 | 188 | 6144 |

In Table 11, i may denote an index of a turbo code internal interleaver, and L may denote a size of the turbo code internal interleaver. According to the embodiment of the present invention, the transport block size may be defined according to the size of the turbo code internal interleaver. That is, the dummy bit may be removed by limiting the transport block size to L.

Bits input to the turbo code internal interleaver may be denoted by $c_0, c_1, \ldots, c_{L-1}$. Herein, L denotes the number of input bits as a transport block size. Output bits calculated via the turbo code internal interleaver may be denoted by $c'_0, c'_1, \ldots, c'_{L-1}$. The input bit and the output bit may satisfy the relation of Equation 5 below.

$$c'_i = c_{\pi(i)}, i=0, 1, \ldots, (L-1) \qquad \text{<Equation 5>}$$

Herein, an output index i and an input index $\pi(i)$ may satisfy Equation 6 below.

$$\pi(i) = (f_1 \cdot i + f_2 \cdot i^2) \bmod L \qquad \text{<Equation 6>}$$

In Equation 6, a parameter $f_1$ and a parameter $f_2$ may be values determined by a table on the basis of a size L of a turbo code internal interleaver (or a size of a transport block).

According to the embodiment of the present invention, the dummy bit may be removed in channel coding if the transport block size is defined to be equal to the turbo code internal interleaver size L defined in Table 11. It is assumed herein that the size of the transport block input to the turbo code internal interleaver is a size considering CRC attachment. For example, if a 24-bit CRC is attached, the transport block size is L-24 which is obtained by subtracting 24 bits from the block size defined in Table 11. That is, in the embodiment of the present invention, the dummy bit may be removed by defining the transport block size to N=L-A. Herein, N, L, and A may respectively denote the transport block size, the turbo code internal interleaver size, and the CRC-bit size.

If channel coding is performed by segmenting the transport block into multiple code blocks, the transport block size may be determined as follows. If the transport block is segmented into two or more code blocks, a CRC is attached to the transport block, and the CRC may also be attached to each segmented code block. When performing turbo coding on the transport block, a size corresponding to a sum of the code block size and a size of CRC attached to the code block must be set to the same as the internal interleaver size defined in Table 11 described above. In addition, it may be determined such that an error rate is not different between code blocks by equally setting the size of the segmented code block.

Then, if it is assumed that a transport block with a size N is segmented into M (M>=2) code blocks each having a size L (where L is a size of a turbo code internal interleaver) and a CRC size is A (e.g., 24 bits), Equation 7 below must be satisfied so that the code blocks have the same size.

$$N + A \times M + 24 = M^*(L+A)$$

$$N = M \times L - A \qquad \text{<Equation 7>}$$

The transport block size may be calculated by using Equation 7. The values L and M may be calculated by considering the defined turbo code internal interleaver size, and may be determined such that a dummy bit is not generated when performing turbo coding on each code block.

Table 12 below shows a case where there are up to 24 code blocks among transport blocks satisfying the aforementioned condition. It is assumed in Table 12 that a CRC size is 24, and if the CRC size is changed, another value may be determined to the transport block size.

TABLE 12

| M | N | M | N | M | N | M | N | M | N | M | N | M | N |
|---|---|---|---|---|---|---|---|---|---|---|---|---|---|
| 2 | 6200 | 2 | 11448 | 4 | 18824 | 5 | 30256 | 8 | 45864 | 12 | 71112 | 18 | 106680 |
| 2 | 6328 | 2 | 11576 | 4 | 19080 | 5 | 30576 | 8 | 46376 | 12 | 71880 | 18 | 107832 |
| 2 | 6456 | 2 | 11704 | 4 | 19336 | 6 | 30936 | 8 | 46888 | 12 | 72648 | 18 | 108984 |
| 2 | 6584 | 2 | 11832 | 4 | 19592 | 5 | 31320 | 8 | 47400 | 12 | 73992 | 18 | 110136 |
| 2 | 6712 | 2 | 11960 | 4 | 19848 | 5 | 31704 | 8 | 47912 | 13 | 74544 | 19 | 111392 |
| 2 | 6840 | 2 | 12088 | 4 | 20104 | 6 | 32088 | 8 | 48424 | 13 | 75376 | 19 | 112608 |
| 2 | 6968 | 2 | 12216 | 4 | 20360 | 6 | 32472 | 8 | 49320 | 13 | 76208 | 19 | 113824 |
| 2 | 7096 | 3 | 12384 | 4 | 20616 | 6 | 32856 | 9 | 49296 | 13 | 77040 | 19 | 115040 |
| 2 | 7224 | 3 | 12576 | 4 | 20872 | 6 | 33240 | 9 | 49872 | 13 | 77872 | 19 | 116256 |
| 2 | 7352 | 3 | 12768 | 4 | 21128 | 6 | 33624 | 9 | 50448 | 13 | 78704 | 20 | 117256 |
| 2 | 7480 | 3 | 12960 | 4 | 21384 | 6 | 34008 | 9 | 51024 | 13 | 80160 | 20 | 118536 |
| 2 | 7608 | 3 | 13152 | 4 | 21640 | 6 | 34392 | 9 | 51600 | 14 | 80280 | 20 | 119816 |
| 2 | 7736 | 3 | 13344 | 4 | 21896 | 6 | 34776 | 9 | 52176 | 14 | 81176 | 20 | 121096 |
| 2 | 7864 | 3 | 13536 | 4 | 22152 | 6 | 35160 | 9 | 52752 | 14 | 82072 | 20 | 123336 |
| 2 | 7992 | 3 | 13728 | 4 | 22408 | 6 | 35544 | 9 | 53328 | 14 | 82968 | 21 | 124464 |
| 2 | 8120 | 3 | 13920 | 4 | 22664 | 6 | 35928 | 9 | 53904 | 14 | 83864 | 21 | 125808 |
| 2 | 8248 | 3 | 14112 | 4 | 22920 | 6 | 36312 | 9 | 54480 | 14 | 84760 | 21 | 127152 |
| 2 | 8376 | 3 | 14304 | 4 | 23176 | 6 | 36696 | 9 | 55488 | 14 | 85656 | 21 | 129504 |
| 2 | 8504 | 3 | 14496 | 4 | 23432 | 6 | 30936 | 10 | 55416 | 14 | 80280 | 22 | 130392 |
| 2 | 8632 | 3 | 14688 | 4 | 23688 | 6 | 31320 | 10 | 56056 | 14 | 81176 | 22 | 131800 |
| 2 | 8760 | 3 | 14880 | 4 | 23944 | 7 | 36992 | 10 | 56696 | 15 | 86016 | 22 | 133208 |
| 2 | 8888 | 3 | 15072 | 4 | 24200 | 7 | 37440 | 10 | 57336 | 15 | 86976 | 22 | 134616 |
| 2 | 9016 | 3 | 15264 | 4 | 24456 | 7 | 37888 | 10 | 57976 | 15 | 87936 | 23 | 136320 |
| 2 | 9144 | 3 | 15456 | 5 | 24496 | 7 | 38336 | 10 | 58616 | 15 | 88896 | 23 | 137792 |
| 2 | 9272 | 3 | 15648 | 5 | 24816 | 7 | 38784 | 10 | 59256 | 15 | 89856 | 23 | 139264 |
| 2 | 9400 | 3 | 15840 | 5 | 25136 | 7 | 39232 | 10 | 59896 | 15 | 90816 | 23 | 140736 |
| 2 | 9528 | 3 | 16032 | 5 | 25456 | 7 | 39680 | 10 | 60536 | 15 | 91776 | 24 | 142248 |
| 2 | 9656 | 3 | 16224 | 5 | 25776 | 7 | 40128 | 10 | 61656 | 16 | 92776 | 24 | 143784 |
| 2 | 9784 | 3 | 16416 | 5 | 26096 | 7 | 40576 | 11 | 61664 | 16 | 93800 | 24 | 145320 |
| 2 | 9912 | 3 | 16608 | 5 | 26416 | 7 | 41024 | 11 | 62368 | 16 | 94824 | 24 | 146856 |
| 2 | 10040 | 3 | 16800 | 5 | 26736 | 7 | 41472 | 11 | 63072 | 16 | 95848 | | |
| 2 | 10168 | 3 | 16992 | 5 | 27056 | 7 | 41920 | 11 | 63776 | 16 | 96872 | | |
| 2 | 10296 | 3 | 17184 | 5 | 27376 | 7 | 42368 | 11 | 64480 | 16 | 97896 | | |
| 2 | 10424 | 3 | 17376 | 5 | 27696 | 7 | 42816 | 11 | 65184 | 17 | 98576 | | |
| 2 | 10552 | 3 | 17568 | 5 | 28016 | 7 | 36992 | 11 | 65888 | 17 | 99664 | | |
| 2 | 10680 | 3 | 17760 | 5 | 28336 | 8 | 42792 | 11 | 66592 | 17 | 100752 | | |
| 2 | 10808 | 3 | 17952 | 5 | 28656 | 8 | 43304 | 11 | 67824 | 17 | 101840 | | |
| 2 | 10936 | 3 | 18144 | 5 | 28976 | 8 | 43816 | 12 | 68040 | 17 | 102928 | | |
| 2 | 11064 | 3 | 18336 | 5 | 29296 | 8 | 44328 | 12 | 68808 | 17 | 104016 | | |
| 2 | 11192 | 3 | 12384 | 5 | 29616 | 8 | 44840 | 12 | 69576 | 18 | 104376 | | |
| 2 | 11320 | 4 | 18568 | 5 | 29936 | 8 | 45352 | 12 | 70344 | 18 | 105528 | | |

In Table 12, M denotes the number of code blocks segmented from one transport block, and N denotes a size of transport block. The size of transport block may be set differently according to the number of segmented code blocks.

When using the size of transport block defined in Table 11 and Table 12, a dummy bit may not be generated when performing channel coding. Accordingly, the same performance may be guaranteed between code blocks. Therefore, according to the embodiment of the present invention, the size of transport block may be calculated and used on the basis of Equation 6 and Equation 7 depending on the number of code blocks segmented from one transport block.

For example, on the basis of a combination of a modulation and coding rate and an allocation resource size, a BS may report to a UE about information on a size of transport block transmitted by the BS. The size of transport block may be expressed with the combination of the modulation and coding rate and the allocated resource size. The BS may determine the modulation and coding rate to be applied to a coded block by referring to a channel quality indicator transmitted by the UE. A size of resource allocated to the coded block may also be determined by considering a resource for transmitting control information and a resource for a reference signal for channel estimation.

FIG. 12 shows the concept of a resource block pair according to an embodiment of the present invention.

Referring to FIG. 12, a horizontal axis represents a time domain, and a vertical axis represents a frequency domain.

In the resource block pair of FIG. 12, it may be assumed that resources for control information transmission are first three OFDM symbols (i.e., an OFDM symbol 0, an OFDM symbol 1, and an OFDM symbol 2) and reference signals are transmitted through two transmit antennas. In this case, the number of REs (resource elements) that can be used for data transmission may be 120 in one unit RBP (resource block pair).

For example, it may be assumed that a modulation scheme and a coding rate used by a BS are 64QAM and 0.6504 and the number of allocated RBs is 10. A size of transport block that can be transmitted through allocated 10 RBs is 4658 bits. This is a value in the range between 4608 bits and 4672 bits, i.e., the transport block size defined in Table 11 above. By defining a rule for determining the size of transport block to any one of the defined two transport block sizes, the size of transport block may be determined according to various modulation and code rates and allocated resource sizes.

In a case where a size of transport block that can be actually transmitted is not equal to a supportable transport block size as described above, the size of transport block may be determined according to a specific rule. For example, according to the embodiment of the present invention, if the size of transport block is not equal to the supportable transport block size, the size of transport block that can be actually transmitted may be determined by using any one of the following rules.

i) Method of determining a transport block size to a maximum supportable transport block size not exceeding an actually transmissible transport block size.

ii) Method of determining a transport block size to a minimum supportable transport block size exceeding an actually transmissible transport block size.

iii) Method of determining a transport block size to a supportable data block having a smallest difference with respect to an actually transmissible data block size.

Table 13 below shows an example of a case where the number of code blocks is in the range of 25 to 66 among transport blocks satisfying the aforementioned condition. It is shown in Table 13 that a size of transport block is defined variously according to a modulation scheme, a coding rate, and an allocated resource even if the same number of code blocks are present. A transport block defined in a case of using 256QAM as the modulation scheme is also included in Table 13. In Table 13, an uppermost end may indicate the number of code blocks, and a value included in a column mapped according to the number of code blocks may be a size of transport block defined variously according to a modulation and coding rate. According to the embodiment of the present invention, one of the sizes of transport blocks defined in the following table may be used when determining the size of transport block.

TABLE 13

| 25 | 26 | 27 | 28 | 29 | 30 | 31 | 32 | 33 |
|---|---|---|---|---|---|---|---|---|
| 76176 | 79224 | 82272 | 85320 | 88368 | 91416 | 94464 | 97512 | 100560 |
| 77776 | 80888 | 84000 | 87112 | 90224 | 93336 | 96448 | 99560 | 102672 |
| 79376 | 82552 | 85728 | 88904 | 92080 | 95256 | 98432 | 101608 | 104784 |
| 80976 | 84216 | 87456 | 90696 | 93936 | 97176 | 100416 | 103656 | 106896 |
| 82576 | 85880 | 89184 | 92488 | 95792 | 99096 | 102400 | 105704 | 109008 |
| 84176 | 87544 | 90912 | 94280 | 97648 | 101016 | 104384 | 107752 | 111120 |
| 85776 | 89208 | 92640 | 96072 | 99504 | 102936 | 106368 | 109800 | 113232 |
| 87376 | 90872 | 94368 | 97864 | 101360 | 104856 | 108352 | 111848 | 115344 |
| 88976 | 92536 | 96096 | 99656 | 103216 | 106776 | 110336 | 113896 | 117456 |
| 90576 | 94200 | 97824 | 101448 | 105072 | 108696 | 112320 | 115944 | 119568 |
| 92176 | 95864 | 99552 | 103240 | 106928 | 110616 | 114304 | 117992 | 121680 |
| 93776 | 97528 | 101280 | 105032 | 108784 | 112536 | 116288 | 120040 | 123792 |
| 95376 | 99192 | 103008 | 106824 | 110640 | 114456 | 118272 | 122088 | 125904 |
| 96976 | 100856 | 104736 | 108616 | 112496 | 116376 | 120256 | 124136 | 128016 |
| 98576 | 102520 | 106464 | 110408 | 114352 | 118296 | 122240 | 126184 | 130128 |
| 100176 | 104184 | 108192 | 112200 | 116208 | 120216 | 124224 | 128232 | 132240 |
| 101776 | 105848 | 109920 | 113992 | 118064 | 122136 | 126208 | 130280 | 134352 |
| 103376 | 107512 | 111648 | 115784 | 119920 | 124056 | 128192 | 132328 | 136464 |
| 104976 | 109176 | 113376 | 117576 | 121776 | 125976 | 130176 | 134376 | 138576 |
| 106576 | 110840 | 115104 | 119368 | 123632 | 127896 | 132160 | 136424 | 140688 |
| 108176 | 112504 | 116832 | 121160 | 125488 | 129816 | 134144 | 138472 | 142800 |
| 109776 | 114168 | 118560 | 122952 | 127344 | 131736 | 136128 | 140520 | 144912 |
| 111376 | 115832 | 120288 | 124744 | 129200 | 133656 | 138112 | 142568 | 147024 |
| 112976 | 117496 | 122016 | 126536 | 131056 | 135576 | 140096 | 144616 | 149136 |
| 114576 | 119160 | 123744 | 128328 | 132912 | 137496 | 142080 | 146664 | 151248 |
| 116176 | 120824 | 125472 | 130120 | 134768 | 139416 | 144064 | 148712 | 153360 |
| 117776 | 122488 | 127200 | 131912 | 136624 | 141336 | 146048 | 150760 | 155472 |
| 119376 | 124152 | 128928 | 133704 | 138480 | 143256 | 148032 | 152808 | 157584 |
| 120976 | 125816 | 130656 | 135496 | 140336 | 145176 | 150016 | 154856 | 159696 |
| 122576 | 127480 | 132384 | 137288 | 142192 | 147096 | 152000 | 156904 | 161808 |
| 124176 | 129144 | 134112 | 139080 | 144048 | 149016 | 153984 | 158952 | 163920 |
| 125776 | 130808 | 135840 | 140872 | 145904 | 150936 | 155968 | 161000 | 166032 |
| 127376 | 132472 | 137568 | 142664 | 147760 | 152856 | 157952 | 163048 | 168144 |
| 128976 | 134136 | 139296 | 144456 | 149616 | 154776 | 159936 | 165096 | 170256 |
| 130576 | 135800 | 141024 | 146248 | 151472 | 156696 | 161920 | 167144 | 172368 |
| 132176 | 137464 | 142752 | 148040 | 153328 | 158616 | 163904 | 169192 | 174480 |
| 133776 | 139128 | 144480 | 149832 | 155184 | 160536 | 165888 | 171240 | 176592 |
| 135376 | 140792 | 146208 | 151624 | 157040 | 162456 | 167872 | 173288 | 178704 |
| 136976 | 142456 | 147936 | 153416 | 158896 | 164376 | 169856 | 175336 | 180816 |
| 138576 | 144120 | 149664 | 155208 | 160752 | 166296 | 171840 | 177384 | 182928 |
| 140176 | 145784 | 151392 | 157000 | 162608 | 168216 | 173824 | 179432 | 185040 |
| 141776 | 147448 | 153120 | 158792 | 164464 | 170136 | 175808 | 181480 | 187152 |
| 143376 | 149112 | 154848 | 160584 | 166320 | 172056 | 177792 | 183528 | 189264 |
| 144976 | 150776 | 156576 | 162376 | 168176 | 173976 | 179776 | 185576 | 191376 |
| 146576 | 152440 | 158304 | 164168 | 170032 | 175896 | 181760 | 187624 | 193488 |
| 148176 | 154104 | 160032 | 165960 | 171888 | 177816 | 183744 | 189672 | 195600 |
| 149776 | 155768 | 161760 | 167752 | 173744 | 179736 | 185728 | 191720 | 197712 |
| 151376 | 157432 | 163488 | 169544 | 175600 | 181656 | 187712 | 193768 | 199824 |
| 152976 | 159096 | 165216 | 171336 | 177456 | 183576 | 189696 | 195816 | 201936 |

| 34 | 35 | 36 | 37 | 38 | 39 | 40 | 41 | 42 |
|---|---|---|---|---|---|---|---|---|
| 103608 | 106656 | 109704 | 112752 | 115800 | 118848 | 121896 | 124944 | 127992 |
| 105784 | 108896 | 112008 | 115120 | 118232 | 121344 | 124456 | 127568 | 130680 |

TABLE 13-continued

| | | | | | | | | |
|---|---|---|---|---|---|---|---|---|
| 107960 | 111136 | 114312 | 117488 | 120664 | 123840 | 127016 | 130192 | 133368 |
| 110136 | 113376 | 116616 | 119856 | 123096 | 126336 | 129576 | 132816 | 136056 |
| 112312 | 115616 | 118920 | 122224 | 125528 | 128832 | 132136 | 135440 | 138744 |
| 114488 | 117856 | 121224 | 124592 | 127960 | 131328 | 134696 | 138064 | 141432 |
| 116664 | 120096 | 123528 | 126960 | 130392 | 133824 | 137256 | 140688 | 144120 |
| 118840 | 122336 | 125832 | 129328 | 132824 | 136320 | 139816 | 143312 | 146808 |
| 121016 | 124576 | 128136 | 131696 | 135256 | 138816 | 142376 | 145936 | 149496 |
| 123192 | 126816 | 130440 | 134064 | 137688 | 141312 | 144936 | 148560 | 152184 |
| 125368 | 129056 | 132744 | 136432 | 140120 | 143808 | 147496 | 151184 | 154872 |
| 127544 | 131296 | 135048 | 138800 | 142552 | 146304 | 150056 | 153808 | 157560 |
| 129720 | 133536 | 137352 | 141168 | 144984 | 148800 | 152616 | 156432 | 160248 |
| 131896 | 135776 | 139656 | 143536 | 147416 | 151296 | 155176 | 159056 | 162936 |
| 134072 | 138016 | 141960 | 145904 | 149848 | 153792 | 157736 | 161680 | 165624 |
| 136248 | 140256 | 144264 | 148272 | 152280 | 156288 | 160296 | 164304 | 168312 |
| 138424 | 142496 | 146568 | 150640 | 154712 | 158784 | 162856 | 166928 | 171000 |
| 140600 | 144736 | 148872 | 153008 | 157144 | 161280 | 165416 | 169552 | 173688 |
| 142776 | 146976 | 151176 | 155376 | 159576 | 163776 | 167976 | 172176 | 176376 |
| 144952 | 149216 | 153480 | 157744 | 162008 | 166272 | 170536 | 174800 | 179064 |
| 147128 | 151456 | 155784 | 160112 | 164440 | 168768 | 173096 | 177424 | 181752 |
| 149304 | 153696 | 158088 | 162480 | 166872 | 171264 | 175656 | 180048 | 184440 |
| 151480 | 155936 | 160392 | 164848 | 169304 | 173760 | 178216 | 182672 | 187128 |
| 153656 | 158176 | 162696 | 167216 | 171736 | 176256 | 180776 | 185296 | 189816 |
| 155832 | 160416 | 165000 | 169584 | 174168 | 178752 | 183336 | 187920 | 192504 |
| 158008 | 162656 | 167304 | 171952 | 176600 | 181248 | 185896 | 190544 | 195192 |
| 160184 | 164896 | 169608 | 174320 | 179032 | 183744 | 188456 | 193168 | 197880 |
| 162360 | 167136 | 171912 | 176688 | 181464 | 186240 | 191016 | 195792 | 200568 |
| 164536 | 169376 | 174216 | 179056 | 183896 | 188736 | 193576 | 198416 | 203256 |
| 166712 | 171616 | 176520 | 181424 | 186328 | 191232 | 196136 | 201040 | 205944 |
| 168888 | 173856 | 178824 | 183792 | 188760 | 193728 | 198696 | 203664 | 208632 |
| 171064 | 176096 | 181128 | 186160 | 191192 | 196224 | 201256 | 206288 | 211320 |
| 173240 | 178336 | 183432 | 188528 | 193624 | 198720 | 203816 | 208912 | 214008 |
| 175416 | 180576 | 185736 | 190896 | 196056 | 201216 | 206376 | 211536 | 216696 |
| 177592 | 182816 | 188040 | 193264 | 198488 | 203712 | 208936 | 214160 | 219384 |
| 179768 | 185056 | 190344 | 195632 | 200920 | 206208 | 211496 | 216784 | 222072 |
| 181944 | 187296 | 192648 | 198000 | 203352 | 208704 | 214056 | 219408 | 224760 |
| 184120 | 189536 | 194952 | 200368 | 205784 | 211200 | 216616 | 222032 | 227448 |
| 186296 | 191776 | 197256 | 202736 | 208216 | 213696 | 219176 | 224656 | 230136 |
| 188472 | 194016 | 199560 | 205104 | 210648 | 216192 | 221736 | 227280 | 232824 |
| 190648 | 196256 | 201864 | 207472 | 213080 | 218688 | 224296 | 229904 | 235512 |
| 192824 | 198496 | 204168 | 209840 | 215512 | 221184 | 226856 | 232528 | 238200 |
| 195000 | 200736 | 206472 | 212208 | 217944 | 223680 | 229416 | 235152 | 240888 |
| 197176 | 202976 | 208776 | 214576 | 220376 | 226176 | 231976 | 237776 | 243576 |
| 199352 | 205216 | 211080 | 216944 | 222808 | 228672 | 234536 | 240400 | 246264 |
| 201528 | 207456 | 213384 | 219312 | 225240 | 231168 | 237096 | 243024 | 248952 |
| 203704 | 209696 | 215688 | 221680 | 227672 | 233664 | 239656 | 245648 | 251640 |
| 205880 | 211936 | 217992 | 224048 | 230104 | 236160 | 242216 | 248272 | 254328 |
| 208056 | 214176 | 220296 | 226416 | 232536 | 238656 | 244776 | 250896 | 257016 |

| 43 | 44 | 45 | 46 | 47 | 48 | 49 | 50 | 51 |
|---|---|---|---|---|---|---|---|---|
| 131040 | 134088 | 137136 | 140184 | 143232 | 146280 | 149328 | 152376 | 155424 |
| 133792 | 136904 | 140016 | 143128 | 146240 | 149352 | 152464 | 155576 | 158688 |
| 136544 | 139720 | 142896 | 146072 | 149248 | 152424 | 155600 | 158776 | 161952 |
| 139296 | 142536 | 145776 | 149016 | 152256 | 155496 | 158736 | 161976 | 165216 |
| 142048 | 145352 | 148656 | 151960 | 155264 | 158568 | 161872 | 165176 | 168480 |
| 144800 | 148168 | 151536 | 154904 | 158272 | 161640 | 165008 | 168376 | 171744 |
| 147552 | 150984 | 154416 | 157848 | 161280 | 164712 | 168144 | 171576 | 175008 |
| 150304 | 153800 | 157296 | 160792 | 164288 | 167784 | 171280 | 174776 | 178272 |
| 153056 | 156616 | 160176 | 163736 | 167296 | 170856 | 174416 | 177976 | 181536 |
| 155808 | 159432 | 163056 | 166680 | 170304 | 173928 | 177552 | 181176 | 184800 |
| 158560 | 162248 | 165936 | 169624 | 173312 | 177000 | 180688 | 184376 | 188064 |
| 161312 | 165064 | 168816 | 172568 | 176320 | 180072 | 183824 | 187576 | 191328 |
| 164064 | 167880 | 171696 | 175512 | 179328 | 183144 | 186960 | 190776 | 194592 |
| 166816 | 170696 | 174576 | 178456 | 182336 | 186216 | 190096 | 193976 | 197856 |
| 169568 | 173512 | 177456 | 181400 | 185344 | 189288 | 193232 | 197176 | 201120 |
| 172320 | 176328 | 180336 | 184344 | 188352 | 192360 | 196368 | 200376 | 204384 |
| 175072 | 179144 | 183216 | 187288 | 191360 | 195432 | 199504 | 203576 | 207648 |
| 177824 | 181960 | 186096 | 190232 | 194368 | 198504 | 202640 | 206776 | 210912 |
| 180576 | 184776 | 188976 | 193176 | 197376 | 201576 | 205776 | 209976 | 214176 |
| 183328 | 187592 | 191856 | 196120 | 200384 | 204648 | 208912 | 213176 | 217440 |
| 186080 | 190408 | 194736 | 199064 | 203392 | 207720 | 212048 | 216376 | 220704 |
| 188832 | 193224 | 197616 | 202008 | 206400 | 210792 | 215184 | 219576 | 223968 |
| 191584 | 196040 | 200496 | 204952 | 209408 | 213864 | 218320 | 222776 | 227232 |
| 194336 | 198856 | 203376 | 207896 | 212416 | 216936 | 221456 | 225976 | 230496 |
| 197088 | 201672 | 206256 | 210840 | 215424 | 220008 | 224592 | 229176 | 233760 |
| 199840 | 204488 | 209136 | 213784 | 218432 | 223080 | 227728 | 232376 | 237024 |
| 202592 | 207304 | 212016 | 216728 | 221440 | 226152 | 230864 | 235576 | 240288 |
| 205344 | 210120 | 214896 | 219672 | 224448 | 229224 | 234000 | 238776 | 243552 |
| 208096 | 212936 | 217776 | 222616 | 227456 | 232296 | 237136 | 241976 | 246816 |
| 210848 | 215752 | 220656 | 225560 | 230464 | 235368 | 240272 | 245176 | 250080 |

TABLE 13-continued

| | | | | | | | | |
|---|---|---|---|---|---|---|---|---|
| 213600 | 218568 | 223536 | 228504 | 233472 | 238440 | 243408 | 248376 | 253344 |
| 216352 | 221384 | 226416 | 231448 | 236480 | 241512 | 246544 | 251576 | 256608 |
| 219104 | 224200 | 229296 | 234392 | 239488 | 244584 | 249680 | 254776 | 259872 |
| 221856 | 227016 | 232176 | 237336 | 242496 | 247656 | 252816 | 257976 | 263136 |
| 224608 | 229832 | 235056 | 240280 | 245504 | 250728 | 255952 | 261176 | 266400 |
| 227360 | 232648 | 237936 | 243224 | 248512 | 253800 | 259088 | 264376 | 269664 |
| 230112 | 235464 | 240816 | 246168 | 251520 | 256872 | 262224 | 267576 | 272928 |
| 232864 | 238280 | 243696 | 249112 | 254528 | 259944 | 265360 | 270776 | 276192 |
| 235616 | 241096 | 246576 | 252056 | 257536 | 263016 | 268496 | 273976 | 279456 |
| 238368 | 243912 | 249456 | 255000 | 260544 | 266088 | 271632 | 277176 | 282720 |
| 241120 | 246728 | 252336 | 257944 | 263552 | 269160 | 274768 | 280376 | 285984 |
| 243872 | 249544 | 255216 | 260888 | 266560 | 272232 | 277904 | 283576 | 289248 |
| 246624 | 252360 | 258096 | 263832 | 269568 | 275304 | 281040 | 286776 | 292512 |
| 249376 | 255176 | 260976 | 266776 | 272576 | 278376 | 284176 | 289976 | 295776 |
| 252128 | 257992 | 263856 | 269720 | 275584 | 281448 | 287312 | 293176 | 299040 |
| 254880 | 260808 | 266736 | 272664 | 278592 | 284520 | 290448 | 296376 | 302304 |
| 257632 | 263624 | 269616 | 275608 | 281600 | 287592 | 293584 | 299576 | 305568 |
| 260384 | 266440 | 272496 | 278552 | 284608 | 290664 | 296720 | 302776 | 308832 |
| 263136 | 269256 | 275376 | 281496 | 287616 | 293736 | 299856 | 305976 | 312096 |

| 52 | 53 | 54 | 55 | 56 | 57 | 58 | 59 | 60 |
|---|---|---|---|---|---|---|---|---|
| 158472 | 161520 | 164568 | 167616 | 170664 | 173712 | 176760 | 179808 | 182856 |
| 161800 | 164912 | 168024 | 171136 | 174248 | 177360 | 180472 | 183584 | 186696 |
| 165128 | 168304 | 171480 | 174656 | 177832 | 181008 | 184184 | 187360 | 190536 |
| 168456 | 171696 | 174936 | 178176 | 181416 | 184656 | 187896 | 191136 | 194376 |
| 171784 | 175088 | 178392 | 181696 | 185000 | 188304 | 191608 | 194912 | 198216 |
| 175112 | 178480 | 181848 | 185216 | 188584 | 191952 | 195320 | 198688 | 202056 |
| 178440 | 181872 | 185304 | 188736 | 192168 | 195600 | 199032 | 202464 | 205896 |
| 181768 | 185264 | 188760 | 192256 | 195752 | 199248 | 202744 | 206240 | 209736 |
| 185096 | 188656 | 192216 | 195776 | 199336 | 202896 | 206456 | 210016 | 213576 |
| 188424 | 192048 | 195672 | 199296 | 202920 | 206544 | 210168 | 213792 | 217416 |
| 191752 | 195440 | 199128 | 202816 | 206504 | 210192 | 213880 | 217568 | 221256 |
| 195080 | 198832 | 202584 | 206336 | 210088 | 213840 | 217592 | 221344 | 225096 |
| 198408 | 202224 | 206040 | 209856 | 213672 | 217488 | 221304 | 225120 | 228936 |
| 201736 | 205616 | 209496 | 213376 | 217256 | 221136 | 225016 | 228896 | 232776 |
| 205064 | 209008 | 212952 | 216896 | 220840 | 224784 | 228728 | 232672 | 236616 |
| 208392 | 212400 | 216408 | 220416 | 224424 | 228432 | 232440 | 236448 | 240456 |
| 211720 | 215792 | 219864 | 223936 | 228008 | 232080 | 236152 | 240224 | 244296 |
| 215048 | 219184 | 223320 | 227456 | 231592 | 235728 | 239864 | 244000 | 248136 |
| 218376 | 222576 | 226776 | 230976 | 235176 | 239376 | 243576 | 247776 | 251976 |
| 221704 | 225968 | 230232 | 234496 | 238760 | 243024 | 247288 | 251552 | 255816 |
| 225032 | 229360 | 233688 | 238016 | 242344 | 246672 | 251000 | 255328 | 259656 |
| 228360 | 232752 | 237144 | 241536 | 245928 | 250320 | 254712 | 259104 | 263496 |
| 231688 | 236144 | 240600 | 245056 | 249512 | 253968 | 258424 | 262880 | 267336 |
| 235016 | 239536 | 244056 | 248576 | 253096 | 257616 | 262136 | 266656 | 271176 |
| 238344 | 242928 | 247512 | 252096 | 256680 | 261264 | 265848 | 270432 | 275016 |
| 241672 | 246320 | 250968 | 255616 | 260264 | 264912 | 269560 | 274208 | 278856 |
| 245000 | 249712 | 254424 | 259136 | 263848 | 268560 | 273272 | 277984 | 282696 |
| 248328 | 253104 | 257880 | 262656 | 267432 | 272208 | 276984 | 281760 | 286536 |
| 251656 | 256496 | 261336 | 266176 | 271016 | 275856 | 280696 | 285536 | 290376 |
| 254984 | 259888 | 264792 | 269696 | 274600 | 279504 | 284408 | 289312 | 294216 |
| 258312 | 263280 | 268248 | 273216 | 278184 | 283152 | 288120 | 293088 | 298056 |
| 261640 | 266672 | 271704 | 276736 | 281768 | 286800 | 291832 | 296864 | 301896 |
| 264968 | 270064 | 275160 | 280256 | 285352 | 290448 | 295544 | 300640 | 305736 |
| 268296 | 273456 | 278616 | 283776 | 288936 | 294096 | 299256 | 304416 | 309576 |
| 271624 | 276848 | 282072 | 287296 | 292520 | 297744 | 302968 | 308192 | 313416 |
| 274952 | 280240 | 285528 | 290816 | 296104 | 301392 | 306680 | 311968 | 317256 |
| 278280 | 283632 | 288984 | 294336 | 299688 | 305040 | 310392 | 315744 | 321096 |
| 281608 | 287024 | 292440 | 297856 | 303272 | 308688 | 314104 | 319520 | 324936 |
| 284936 | 290416 | 295896 | 301376 | 306856 | 312336 | 317816 | 323296 | 328776 |
| 288264 | 293808 | 299352 | 304896 | 310440 | 315984 | 321528 | 327072 | 332616 |
| 291592 | 297200 | 302808 | 308416 | 314024 | 319632 | 325240 | 330848 | 336456 |
| 294920 | 300592 | 306264 | 311936 | 317608 | 323280 | 328952 | 334624 | 340296 |
| 298248 | 303984 | 309720 | 315456 | 321192 | 326928 | 332664 | 338400 | 344136 |
| 301576 | 307376 | 313176 | 318976 | 324776 | 330576 | 336376 | 342176 | 347976 |
| 304904 | 310768 | 316632 | 322496 | 328360 | 334224 | 340088 | 345952 | 351816 |
| 308232 | 314160 | 320088 | 326016 | 331944 | 337872 | 343800 | 349728 | 355656 |
| 311560 | 317552 | 323544 | 329536 | 335528 | 341520 | 347512 | 353504 | 359496 |
| 314888 | 320944 | 327000 | 333056 | 339112 | 345168 | 351224 | 357280 | 363336 |
| 318216 | 324336 | 330456 | 336576 | 342696 | 348816 | 354936 | 361056 | 367176 |

| 61 | 62 | 63 | 64 | 65 | 66 |
|---|---|---|---|---|---|
| 185904 | 188952 | 192000 | 195048 | 198096 | 201144 |
| 189808 | 192920 | 196032 | 199144 | 202256 | 205368 |
| 193712 | 196888 | 200064 | 203240 | 206416 | 209592 |
| 197616 | 200856 | 204096 | 207336 | 210576 | 213816 |
| 201520 | 204824 | 208128 | 211432 | 214736 | 218040 |
| 205424 | 208792 | 212160 | 215528 | 218896 | 222264 |

TABLE 13-continued

| | | | | | |
|---|---|---|---|---|---|
| 209328 | 212760 | 216192 | 219624 | 223056 | 226488 |
| 213232 | 216728 | 220224 | 223720 | 227216 | 230712 |
| 217136 | 220696 | 224256 | 227816 | 231376 | 234936 |
| 221040 | 224664 | 228288 | 231912 | 235536 | 239160 |
| 224944 | 228632 | 232320 | 236008 | 239696 | 243384 |
| 228848 | 232600 | 236352 | 240104 | 243856 | 247608 |
| 232752 | 236568 | 240384 | 244200 | 248016 | 251832 |
| 236656 | 240536 | 244416 | 248296 | 252176 | 256056 |
| 240560 | 244504 | 248448 | 252392 | 256336 | 260280 |
| 244464 | 248472 | 252480 | 256488 | 260496 | 264504 |
| 248368 | 252440 | 256512 | 260584 | 264656 | 268728 |
| 252272 | 256408 | 260544 | 264680 | 268816 | 272952 |
| 256176 | 260376 | 264576 | 268776 | 272976 | 277176 |
| 260080 | 264344 | 268608 | 272872 | 277136 | 281400 |
| 263984 | 268312 | 272640 | 276968 | 281296 | 285624 |
| 267888 | 272280 | 276672 | 281064 | 285456 | 289848 |
| 271792 | 276248 | 280704 | 285160 | 289616 | 294072 |
| 275696 | 280216 | 284736 | 289256 | 293776 | 298296 |
| 279600 | 284184 | 288768 | 293352 | 297936 | 302520 |
| 283504 | 288152 | 292800 | 297448 | 302096 | 306744 |
| 287408 | 292120 | 296832 | 301544 | 306256 | 310968 |
| 291312 | 296088 | 300864 | 305640 | 310416 | 315192 |
| 295216 | 300056 | 304896 | 309736 | 314576 | 319416 |
| 299120 | 304024 | 308928 | 313832 | 318736 | 323640 |
| 303024 | 307992 | 312960 | 317928 | 322896 | 327864 |
| 306928 | 311960 | 316992 | 322024 | 327056 | 332088 |
| 310832 | 315928 | 321024 | 326120 | 331216 | 336312 |
| 314736 | 319896 | 325056 | 330216 | 335376 | 340536 |
| 318640 | 323864 | 329088 | 334312 | 339536 | 344760 |
| 322544 | 327832 | 333120 | 338408 | 343696 | 348984 |
| 326448 | 331800 | 337152 | 342504 | 347856 | 353208 |
| 330352 | 335768 | 341184 | 346600 | 352016 | 357432 |
| 334256 | 339736 | 345216 | 350696 | 356176 | 361656 |
| 338160 | 343704 | 349248 | 354792 | 360336 | 365880 |
| 342064 | 347672 | 353280 | 358888 | 364496 | 370104 |
| 345968 | 351640 | 357312 | 362984 | 368656 | 374328 |
| 349872 | 355608 | 361344 | 367080 | 372816 | 378552 |
| 353776 | 359576 | 365376 | 371176 | 376976 | 382776 |
| 357680 | 363544 | 369408 | 375272 | 381136 | 387000 |
| 361584 | 367512 | 373440 | 379368 | 385296 | 391224 |
| 365488 | 371480 | 377472 | 383464 | 389456 | 395448 |
| 369392 | 375448 | 381504 | 387560 | 393616 | 399672 |
| 373296 | 379416 | 385536 | 391656 | 397776 | 403896 |

All or some of the transport block sizes of Table 13 may be used as a transport block size in a system supporting 256QAM. In addition, some of the transport block sizes of Table 13 support 256QAM, and may be used as a size of transport block transmitted through 2-layer, 3-layer, 4-layer or 5-layer, 6-layer, 7-layer, 8-layer.

According to another embodiment of the present invention, a size of transport block may be determined by differently setting a rank supported depending on a modulation scheme. For example, some of the transport block sizes among the transport block sizes of Table 13 support 256QAM, and may be determined not to support a transport block size greater than or equal to 3-layer as a size of transport block transmitted with a specific rank or below (i.e., 2 layer or below).

Figure 13:
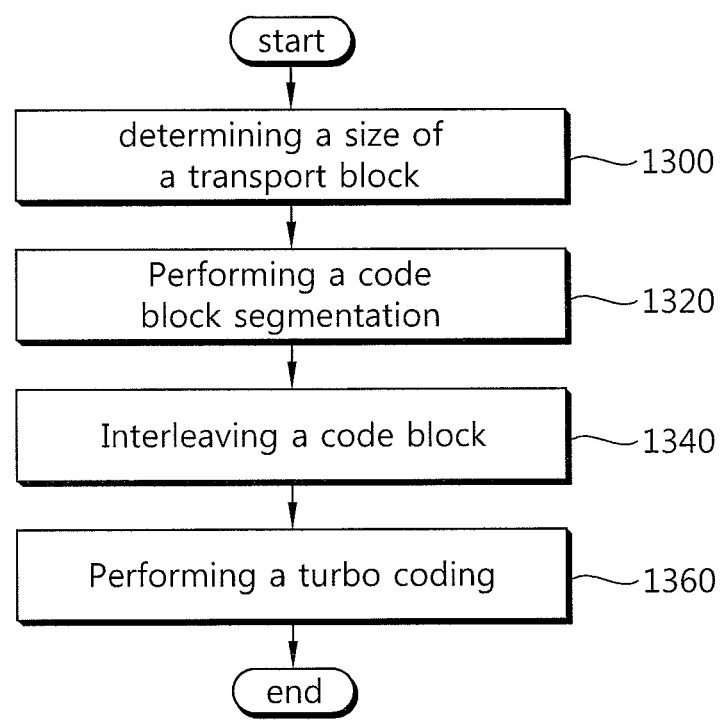
FIG. 13 is a flowchart showing a method of performing turbo coding for a transport block according to an embodiment of the present invention.

FIG. 13 is a flowchart showing a method of performing turbo coding for a transport block according to an embodiment of the present invention.

Referring to FIG. 13, a size of transport block is determined (step S1300).

According to the embodiment of the present invention, an unnecessary dummy bit can be removed by determining the size of transport block according to a size of a turbo code internal interleaver.

The size of transport block may be determined according to whether one transport block is segmented into a single code block or multiple code blocks as described above. If the transport block is segmented into the single code block, the size of transport block may be a value obtained by subtracting a CRC bit size from the turbo code internal interleaver size. If the transport block is segmented into the multiple code blocks, the size of transport block may be a value obtained by subtracting a CRC bit size from a value obtained by multiplying a size of each code block by the number of segmented code blocks. The size of transport block may be determined by additionally considering a modulation scheme (e.g., 64QAM, 256QAM) and an allocation resource.

For turbo coding, the transport block is subjected to code block segmentation (step S1320).

In the code block segmentation, a single transport block may be determined to the code block when the single transport block is not segmented into multiple code blocks. If the single transport block is segmented into the multiple code blocks, the single transport block may be determined to the multiple code blocks.

On the basis of the turbo code internal interleaver, data included in the code block is interleaved (step S1340).

The turbo code internal interleaver may interleave the data included in the code block. A size of interleaved code block may be a value obtained by considering the turbo code internal interleaver size as described above.

Turbo coding is performed on the interleaved code block (step S1360).

The turbo coding may be performed on the interleaved code block. A size of code block may be determined by considering the turbo code internal interleaver size, thereby being able to reduce a dummy bit generated in turbo coding.

FIG. 14 is a block diagram of a wireless communication system according to an embodiment of the present invention.

Referring to FIG. 14, a BS 1400 includes a processor 1410, a memory 1420, and a radio frequency (RF) unit 1430. The memory 1420 is coupled to the processor 1410, and stores a variety of information for driving the processor 1410. The RF unit 1420 is coupled to the processor 1410, and transmits and/or receives a radio signal. The processor 1410 implements the proposed functions, procedures, and/or methods. In the aforementioned embodiment, an operation of the BS may be implemented by the processor 1410.

For example, the processor 1410 determines a size of a transport block, divides the transport block into at least one code block based on the size of transport block, interleaves the at least one code block by an interleaver, and performs a turbo coding for the interleaved at least one code block. The processor 1410 may be determined based on the number of the divided code blocks.

A wireless device 1450 includes a processor 1460, a memory 1470, and an RF unit 1480. The memory 1470 is coupled to the processor 1460, and stores a variety of information for driving the processor 1460. The RF unit 1480 is coupled to the processor 1460, and transmits and/or receives a radio signal. The processor 1460 implements the proposed functions, procedures, and/or methods. In the aforementioned embodiment, an operation of the wireless device may be implemented by the processor 1460.

For example, the processor 1460 determines a size of a transport block, divides the transport block into at least one code block based on the size of transport block, interleaves the at least one code block by an interleaver, and performs a turbo coding for the interleaved at least one code block. The processor 1460 may be determined based on the number of the divided code blocks.

The processor may include an application-specific integrated circuit (ASIC), a separate chipset, a logic circuit, and a data processing unit. The memory may include a read-only memory (ROM), a random access memory (RAM), a flash memory, a memory card, a storage medium, and/or other equivalent storage devices. The RF unit may include a baseband circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

The invention claimed is:

1. A method for encoding a transport block in a wireless communication system, comprising:
   determining, at a transmitting device, a size of the transport block based on a size of an allocated resource, a number of layers, and modulation and coding scheme (MCS) for the transport block, wherein the size of the transport block is determined from among a plurality of predetermined sizes, wherein the plurality of the predetermined sizes include 305976 bits, 324336 bits, and 391656 bits when the transport block is mapped to four-layer spatial multiplexing and when 256 Quadrature amplitude modulation (QAM) is used for the transport block;
   attaching, at the transmitting device, a first cyclic redundancy check (CRC) code to the transport block to configure a first CRC-attached transport block;
   configuring, at the transmitting device, a second CRC-attached transport block based on the first CRC-attached transport block, wherein if a size of the first CRC-attached transport block is larger than a threshold, the transmitting device segments the first CRC-attached transport block to configure the second CRC-attached transport block;
   applying, at the transmitting device, turbo coding scheme to the second CRC-attached transport block; and
   transmitting, at the transmitting device, control information indicating the MCS to enable a receiving device to determine a size of the transport block.

2. The method of claim 1, wherein the control information indicating the MCS is transmitted via a physical downlink control channel (PDDCH) to the receiving device.

3. The method of claim 1, wherein the transmitting device is a base station and the receiving device is a user equipment.

4. The method of claim 1, wherein the turbo coding scheme is performed by a turbo-encoder, wherein the turbo-encoder interleaves an input bit as follow, $$c'_i = c_{\pi(i)}, i=0, 1, \ldots, (L-1)$$

where $c_{\pi(i)}$ is an input bit of an internal interleaver of the turbo-encoder, $c'_i$ is an output bit of the internal interleaver, L is the size of the transport block, i is an index of the input bit, where $\pi(i)$ is determined as below, $$\pi(i) = (f_1 \cdot i + f_2 \cdot i^2) \bmod L,$$

and wherein $f_1$ and $f_2$ are predetermined values according to L, L is the size of the transport block.

5. The method of claim 1, wherein the transport block is transmitted via a physical downlink shared channel (PDSCH).

6. A transmitting device for encoding a transport block in a wireless communication system, comprising:
   a radio frequency unit configured to transmit a signal;
   a processor coupled to the radio frequency unit and configured to:
   determine a size of the transport block based on a size of an allocated resource, a number of layers, and modulation and coding scheme (MCS) for the transport block, wherein the size of the transport block is determined from among a plurality of predetermined sizes, wherein the plurality of the predetermined sizes include 305976 bits, 324336 bits, and 391656 bits when the transport block is mapped to four-layer spatial multiplexing and when 256 Quadrature amplitude modulation (QAM) is used for the transport block;

attach a first cyclic redundancy check (CRC) code to the transport block to configure a first CRC-attached transport block;

configure a second CRC-attached transport block based on the first CRC-attached transport block, wherein if a size of the first CRC-attached transport block is larger than a threshold, the transmitting device segments the first CRC-attached transport block to configure the second CRC-attached transport block;

apply turbo coding scheme to the second CRC-attached transport block; and transmit control information indicating the MCS to enable a receiving device to determine a size of the transport block.

7. The transmitting device of claim 6, wherein the control information indicating the MCS is transmitted via a physical downlink control channel (PDDCH) to the receiving device.

8. The transmitting device of claim 6, wherein the transmitting device is a base station and the receiving device is a user equipment.

9. The transmitting device of claim 6, wherein the turbo coding scheme is performed by a turbo-encoder, wherein the turbo-encoder interleaves an input bit as follow, $$c'_i = c_{\pi(i)}, i=0, 1, \ldots, (L-1)$$

where $c_{\pi(i)}$ is an input bit of an internal interleaver of the turbo-encoder, $c'_i$ is an output bit of the internal interleaver, L is the size of the transport block, i is an index of the input bit, where $\pi(i)$ is determined as below, $$\pi(i) = (f_1 \cdot i + f_2 \cdot i^2) \bmod L,$$

and wherein $f_1$ and $f_2$ are predetermined values according to L, L is the size of the transport block.

10. The transmitting device of claim 6, wherein the transport block is transmitted via a physical downlink shared channel (PDSCH).

* * * * *